US010821652B2

(12) United States Patent
Tobin et al.

(10) Patent No.: US 10,821,652 B2
(45) Date of Patent: Nov. 3, 2020

(54) VACUUM FORMING MOLD ASSEMBLY AND METHOD FOR CREATING A VACUUM FORMING MOLD ASSEMBLY

(71) Applicant: General Electric Company, Schenectady, NY (US)

(72) Inventors: James Robert Tobin, Simpsonville, SC (US); Boobalan Ayyasamy, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 15/818,862

(22) Filed: Nov. 21, 2017

(65) Prior Publication Data
US 2019/0152126 A1 May 23, 2019

(51) Int. Cl.
| B29C 51/36 | (2006.01) |
| B29C 70/42 | (2006.01) |
| B29C 70/44 | (2006.01) |
| B29K 105/06 | (2006.01) |
| B29L 31/08 | (2006.01) |

(52) U.S. Cl.
CPC .............. *B29C 51/36* (2013.01); *B29C 70/42* (2013.01); *B29C 70/44* (2013.01); *B29K 2105/06* (2013.01); *B29L 2031/085* (2013.01)

(58) Field of Classification Search
CPC ....... B29C 51/36; B29C 51/10; B29C 33/308; B29C 33/302; B29C 33/301; B29C 70/44; B29C 70/42; B29C 69/02; B29C 69/001
See application file for complete search history.

(56) References Cited

U.S. PATENT DOCUMENTS

| RE19,412 E | 1/1935 | Zaparka |
| 2,450,440 A | 10/1948 | Mills |
| 2,451,131 A | 10/1948 | Vidal |
| 2,503,450 A | 4/1950 | Nebesar |
| 3,000,446 A | 9/1961 | Warnken |

(Continued)

FOREIGN PATENT DOCUMENTS

| CN | 101906251 A | 12/2010 |
| CN | 103358564 A | 10/2013 |

(Continued)

OTHER PUBLICATIONS

International Search Report, dated May 31, 2019 for International application No. PCT/US2018/059141.

(Continued)

*Primary Examiner* — Joseph S Del Sole
*Assistant Examiner* — Mohamed K Ahmed Ali
(74) *Attorney, Agent, or Firm* — Dority & Manning, P.A.

(57) ABSTRACT

The present disclosure is directed to a mold assembly for vacuum forming a component. The mold assembly includes plurality of support plates and a plurality of mold plates removably coupled to the plurality of support plates. The plurality of mold plates is stacked and removably coupled together to form a mold configured for forming the component. Each mold plate including a first surface partially defining a top surface of the mold, a second surface spaced apart from the first surface, a third surface extending from the first surface to the second surface, and a fourth surface spaced apart from the third surface and extending from the first surface to the second surface.

20 Claims, 13 Drawing Sheets

(56) References Cited

U.S. PATENT DOCUMENTS

| | | | |
|---|---|---|---|
| 3,093,219 A | 6/1963 | Ramme | |
| 3,137,887 A | 6/1964 | Mannino et al. | |
| 3,321,019 A | 5/1967 | Dmitroff et al. | |
| 3,528,753 A | 9/1970 | Dutton et al. | |
| 3,586,460 A | 6/1971 | Toner | |
| 3,956,564 A | 5/1976 | Hillig | |
| 4,319,872 A * | 3/1982 | Lupke | B29C 48/901 425/532 |
| 4,329,119 A | 5/1982 | Baskin | |
| 4,474,536 A | 10/1984 | Gougeon et al. | |
| 4,626,172 A | 12/1986 | Mouille et al. | |
| 4,718,844 A * | 1/1988 | Dickhut | B29C 33/04 425/522 |
| 5,059,109 A * | 10/1991 | Dickhut | B29C 33/10 425/233 |
| 5,088,665 A | 2/1992 | Vijgen et al. | |
| 5,346,367 A | 9/1994 | Doolin et al. | |
| 6,264,877 B1 | 7/2001 | Pallu De La Barriere | |
| 6,890,152 B1 | 5/2005 | Thisted | |
| 7,059,833 B2 | 6/2006 | Stiesdal et al. | |
| 7,364,407 B2 | 4/2008 | Grabau | |
| 7,458,777 B2 | 12/2008 | Herr | |
| 7,637,721 B2 | 12/2009 | Driver et al. | |
| 7,976,275 B2 | 7/2011 | Miebach et al. | |
| 7,988,421 B2 | 8/2011 | Bakhuis et al. | |
| 8,007,624 B2 | 8/2011 | Stiesdal | |
| 8,062,728 B2 | 11/2011 | De Beats | |
| 8,083,488 B2 | 12/2011 | Fritz | |
| 8,092,187 B2 | 1/2012 | Bell | |
| 8,162,590 B2 | 4/2012 | Haag | |
| 8,273,806 B2 | 9/2012 | Guadagno et al. | |
| 8,317,479 B2 | 11/2012 | Vronsky et al. | |
| 8,376,450 B1 | 2/2013 | Long et al. | |
| 8,540,491 B2 | 9/2013 | Gruhn | |
| 8,602,761 B2 | 12/2013 | Arrizabalaga | |
| 8,657,581 B2 | 2/2014 | Pilpel et al. | |
| 8,673,106 B1 | 3/2014 | Jolley et al. | |
| 8,678,746 B2 | 3/2014 | Haag | |
| 8,708,691 B2 | 4/2014 | Matsen et al. | |
| 8,747,098 B1 | 6/2014 | Johnson et al. | |
| 8,865,798 B2 | 10/2014 | Merle et al. | |
| 8,877,116 B2 | 11/2014 | Grabau | |
| 8,932,024 B2 | 1/2015 | Hayashi et al. | |
| 8,961,142 B2 | 2/2015 | Wansink | |
| 8,992,813 B2 | 3/2015 | Robbins et al. | |
| 9,090,027 B2 | 7/2015 | Sutton | |
| 9,150,721 B2 | 10/2015 | Bateman et al. | |
| 9,377,005 B2 | 6/2016 | Yarbrough et al. | |
| 9,434,142 B2 | 9/2016 | Levit | |
| 9,458,821 B2 | 10/2016 | Jacobsen et al. | |
| 9,512,818 B2 | 12/2016 | Richtman | |
| 9,719,489 B2 | 8/2017 | Stewart | |
| 10,273,935 B2 | 4/2019 | Albert | |
| 2004/0253114 A1 | 12/2004 | Gunneskov et al. | |
| 2007/0065290 A1 | 3/2007 | Herr | |
| 2007/0077150 A1 | 4/2007 | Llorente Gonzalez | |
| 2007/0107189 A1 | 5/2007 | Prichard | |
| 2009/0068017 A1 | 3/2009 | Rudling | |
| 2009/0074585 A1 | 3/2009 | Koegler et al. | |
| 2009/0140527 A1 | 6/2009 | Pawar | |
| 2009/0148300 A1 | 6/2009 | Driver et al. | |
| 2009/0155084 A1 | 6/2009 | Livingston et al. | |
| 2009/0301648 A1 | 12/2009 | Hogg | |
| 2010/0047070 A1 | 2/2010 | Slot | |
| 2010/0121475 A1 | 5/2010 | Lyons | |
| 2010/0135806 A1 | 6/2010 | Benito | |
| 2010/0135815 A1 | 6/2010 | Bagepalli | |
| 2010/0296940 A1 | 11/2010 | Zuteck | |
| 2010/0296941 A1 | 11/2010 | Zuteck | |
| 2011/0018282 A1 | 1/2011 | Hayashi et al. | |
| 2011/0076149 A1 | 3/2011 | Santiago et al. | |
| 2011/0097211 A1 | 4/2011 | Rudling | |
| 2011/0097326 A1 | 4/2011 | Luehrsen | |
| 2011/0100540 A1 | 5/2011 | Matthew | |
| 2011/0103965 A1 | 5/2011 | Matthew | |
| 2011/0135467 A1 | 6/2011 | Saddoughi et al. | |
| 2011/0142635 A1 | 6/2011 | Frizt | |
| 2011/0142667 A1 | 6/2011 | Miebach et al. | |
| 2011/0142668 A1 | 6/2011 | Rao | |
| 2011/0142670 A1 | 6/2011 | Pilpel | |
| 2011/0176928 A1 | 7/2011 | Jensen | |
| 2011/0200444 A1 | 8/2011 | Garcia | |
| 2011/0223028 A1 | 9/2011 | Stege et al. | |
| 2011/0243736 A1 | 10/2011 | Bell | |
| 2011/0243750 A1 | 10/2011 | Gruhn | |
| 2011/0266721 A1 | 11/2011 | Song et al. | |
| 2011/0268558 A1 | 11/2011 | Driver | |
| 2011/0286853 A1 | 11/2011 | Kristensen | |
| 2012/0009069 A1 | 1/2012 | Grove-Nielsen | |
| 2012/0027590 A1 | 2/2012 | Bonnet | |
| 2012/0027610 A1 | 2/2012 | Yarbrough | |
| 2012/0027612 A1 | 2/2012 | Yarbrough | |
| 2012/0027613 A1 | 2/2012 | Yarbrough | |
| 2012/0121430 A1 | 5/2012 | Olsen et al. | |
| 2012/0128810 A1 | 5/2012 | Arriola Arizabalaga et al. | |
| 2012/0134848 A1 | 5/2012 | Ramirez Jimenez et al. | |
| 2012/0138218 A1 | 6/2012 | Dean et al. | |
| 2012/0183408 A1 | 7/2012 | Noerlem | |
| 2012/0186730 A1 | 7/2012 | Sindo | |
| 2012/0263913 A1 | 10/2012 | Karem | |
| 2013/0108455 A1 | 5/2013 | Quiring et al. | |
| 2013/0164133 A1 | 6/2013 | Grove-Nielsen | |
| 2013/0186558 A1 | 7/2013 | Comb | |
| 2013/0241117 A1 * | 9/2013 | Lind | B29C 70/443 264/511 |
| 2014/0072715 A1 | 3/2014 | Jones et al. | |
| 2014/0178204 A1 | 6/2014 | Livingston et al. | |
| 2014/0186175 A1 | 7/2014 | Baehmann et al. | |
| 2014/0205454 A1 | 7/2014 | Giovannetti et al. | |
| 2014/0295187 A1 | 10/2014 | Jacobsen | |
| 2014/0322023 A1 | 10/2014 | Tapia | |
| 2014/0328692 A1 | 11/2014 | Riddell et al. | |
| 2014/0334930 A1 | 11/2014 | Rob | |
| 2015/0224759 A1 | 8/2015 | Boon | |
| 2015/0247487 A1 | 9/2015 | Oerlemans et al. | |
| 2015/0308404 A1 | 10/2015 | Dahl | |
| 2015/0316028 A1 | 11/2015 | Breckenfeld | |
| 2015/0322920 A1 | 11/2015 | Jones | |
| 2016/0023433 A1 | 1/2016 | Langone | |
| 2016/0052173 A1 | 2/2016 | Hunter | |
| 2016/0107397 A1 | 4/2016 | Schibsbye | |
| 2016/0146019 A1 | 5/2016 | Pizano et al. | |
| 2016/0168997 A1 | 6/2016 | Garm | |
| 2016/0263844 A1 | 9/2016 | Smith | |
| 2016/0297145 A1 | 10/2016 | Wu | |
| 2016/0319801 A1 | 11/2016 | Smith | |
| 2016/0327019 A1 | 11/2016 | Tobin et al. | |
| 2016/0327020 A1 | 11/2016 | Tobin et al. | |
| 2016/0327021 A1 | 11/2016 | Tobin et al. | |
| 2016/0354984 A1 | 12/2016 | Hedges | |
| 2016/0377050 A1 | 12/2016 | Caruso et al. | |
| 2016/0377051 A1 | 12/2016 | Caruso et al. | |
| 2016/0377052 A1 | 12/2016 | Caruso et al. | |
| 2017/0015066 A1 | 1/2017 | Herrmann | |
| 2017/0021575 A1 | 1/2017 | Hansen et al. | |
| 2017/0022821 A1 | 1/2017 | Ferber | |
| 2017/0030330 A1 | 2/2017 | Caruso | |
| 2017/0050372 A1 | 2/2017 | Nielsen et al. | |
| 2017/0051718 A1 | 2/2017 | Klitgaard | |
| 2017/0057158 A1 | 3/2017 | Caruso et al. | |
| 2017/0058862 A1 | 3/2017 | Caruso et al. | |
| 2017/0058865 A1 | 3/2017 | Caruso et al. | |
| 2017/0058866 A1 | 3/2017 | Caruso | |
| 2017/0074236 A1 | 3/2017 | Hynum et al. | |
| 2017/0074237 A1 | 3/2017 | Caruso et al. | |
| 2017/0074238 A1 | 3/2017 | Tobin et al. | |
| 2017/0074240 A1 | 3/2017 | Caruso et al. | |
| 2017/0082087 A1 | 3/2017 | Yarbrough | |
| 2017/0082088 A1 | 3/2017 | Yarbrough et al. | |
| 2017/0100902 A1 | 4/2017 | Asmatulu et al. | |
| 2017/0113265 A1 | 4/2017 | Slavens et al. | |
| 2017/0122287 A1 | 5/2017 | Dobbe et al. | |
| 2017/0145990 A1 | 5/2017 | Drack et al. | |
| 2017/0175534 A1 | 6/2017 | Ferber | |

(56) References Cited

U.S. PATENT DOCUMENTS

| | | |
|---|---|---|
| 2017/0204833 A1 | 7/2017 | Albert et al. |
| 2017/0225362 A1 | 8/2017 | Anthony et al. |
| 2017/0252966 A1 | 9/2017 | Susnjara |
| 2017/0306766 A1 | 10/2017 | Munzer |
| 2018/0135602 A1 | 5/2018 | Tobin et al. |
| 2018/0156190 A1 | 6/2018 | Johnson |
| 2018/0216601 A1 | 8/2018 | Yarbrough |
| 2018/0223794 A1 | 8/2018 | Tobin et al. |
| 2018/0229452 A1 | 8/2018 | Ogale |
| 2018/0264749 A1 | 9/2018 | Albert |
| 2018/0283349 A1 | 10/2018 | Wardropper |
| 2018/0311927 A1 | 11/2018 | Tyan |
| 2019/0001589 A1 | 1/2019 | Salimi |
| 2019/0032491 A1 | 1/2019 | Nissen et al. |
| 2019/0153994 A1 | 5/2019 | Tobin |
| 2019/0178227 A1 | 6/2019 | Hawkins et al. |
| 2019/0195191 A1 | 6/2019 | Girolamo et al. |
| 2019/0291861 A1 | 9/2019 | McIntyre et al. |
| 2019/0293049 A1 | 9/2019 | Roberts et al. |

FOREIGN PATENT DOCUMENTS

| | | |
|---|---|---|
| CN | 204488065 U | 7/2015 |
| CN | 104955278 A | 9/2015 |
| CN | 107187020 A | 9/2018 |
| EP | 0435446 A2 | 7/1991 |
| EP | 2204577 A2 | 7/2010 |
| EP | 2653717 A1 | 10/2013 |
| EP | 3037655 A1 | 6/2016 |
| EP | 3138697 A1 | 8/2017 |
| ES | 2371893 | 11/2012 |
| JP | H07102609 B2 | 11/1995 |
| JP | 2000 317972 A | 11/2000 |
| JP | 2007/009926 A | 1/2007 |
| JP | 2007/092716 A | 4/2007 |
| JP | 2012 158151 A | 8/2012 |
| JP | 2016 032929 A | 3/2016 |
| KR | 101 520 898 B1 | 5/2015 |
| WO | WO2006/039953 | 4/2006 |
| WO | WO2010/025830 A2 | 3/2010 |
| WO | WO2011/088835 A2 | 7/2011 |
| WO | WO2011/098785 A2 | 8/2011 |
| WO | WO2012/076168 A2 | 6/2012 |
| WO | WO2013/023745 A1 | 2/2013 |
| WO | WO2013/178624 A2 | 12/2013 |
| WO | WO2015/015202 A1 | 2/2015 |
| WO | WO2017/092766 A1 | 6/2017 |
| WO | WO2018/015250 A1 | 1/2018 |

OTHER PUBLICATIONS

U.S. Appl. No. 15/424,055, filed Feb. 3, 2017.

U.S. Appl. No. 15/424,084, filed Feb. 3, 2017.

CGTech Vericut, Automated Fibre Placement—wind blade: Vericut Composite CNC simulation, Sep. 16, 2015, YouTube, retrieved from the Internet on Sep. 28, 2019, URL: https://youtu.be/xFNtTE82DiU (Year: 2015).

Thamizhisai Periyaswamy, Karthikeyan Balasubramanian, Christopher Pastore, "Novel characterization method for fibrous materials using non-contact acoustics: Material properties revealed by ultrasonic perturbations", Sep. 16, 2014, Elsevier, Ultrasonics 56, 261-369 (Year: 2014).

Zhai, Yuwei et. al., Additive Manufacturing: Making Imagination the Major Limitation, Journal of Metals, vol. 66, No. 5, Springer, NY, Mar. 11, 2014. pp. 808-816.

Patlolla, New progress in self-healing technology of composite wind turbine blades, Department of Mechanical Engineering, Wichita State Univeristy, https://soar.wichita.edu/handle/10057/5493, Feb. 16, 2012, (Abstract Only).

Matt, Development of Novel Self-Healing Polymer Composites for Use in Wind Turbine Blades http://energyresources.asmedigitalcollection.asme.org/article.aspx?articleid=2174064, The American Society of Mechanical Engineers, Journal of Energy Resources Technology, vol. 137, Issue 5, Sep. 1, 2015 (Abstract Only).

Teuwen et al., Vacuum Infused Thermoplastic Composites for Wind Turbine Blades, 2008 Wind Turbine Blade Workshop—Sandia National Laboratories, Jun. 3, 2008, 22 pages.

* cited by examiner

VACUUM FORMING MOLD ASSEMBLY AND METHOD FOR CREATING A VACUUM FORMING MOLD ASSEMBLY

FIELD

The present disclosure generally relates to vacuum forming molds. More particularly, the present disclosure relates vacuum forming mold assemblies and methods for creating vacuum forming mold assemblies, such as for use in forming wind turbine components.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

Each rotor blade generally includes various shell portions, such as a pressure side shell and a suction side shell bonded together along leading and trailing edges of the rotor blade. The shells are formed using a suitable mold. For example, in certain instances, the mold may be formed via sand casting. However, given the large size of many wind turbine rotor blades, such sand casting operations are expensive, thereby increasing the overall cost of the wind turbine. Furthermore, it is time-consuming and expensive to integrate all the vacuum, heating, and cooling lines into the sand cast mold. Additionally, such molds are difficult to modify when the design of the rotor blades changes. As such, new molds are required when modifications to the rotor blade design are made.

Accordingly, an improved vacuum forming mold assembly and a method for creating a vacuum forming mold assembly would be welcomed in the art.

BRIEF DESCRIPTION

Aspects and advantages of the technology will be set forth in part in the following description, or may be obvious from the description, or may be learned through practice of the technology.

In one aspect, the present disclosure is directed to a mold assembly for vacuum forming a component. The mold assembly includes plurality of support plates and a plurality of mold plates removably coupled to the plurality of support plates. The plurality of mold plates is stacked and removably coupled together to form a mold configured for forming the component. Each mold plate including a first surface partially defining a top surface of the mold, a second surface spaced apart from the first surface, a third surface extending from the first surface to the second surface, and a fourth surface spaced apart from the third surface and extending from the first surface to the second surface. One or more of the plurality of mold plates define at least one of a plurality of grooves in the corresponding third surfaces extending from the corresponding first surfaces to the corresponding second surfaces, the third surfaces of one or more of the mold plates being in contact with the fourth surfaces of the adjacent mold plates such that each groove forms a vacuum passage within the mold; a plurality of grooves in the corresponding fourth surfaces extending from the corresponding first surfaces to the corresponding second surfaces, the fourth surfaces of one or more of the mold plates being in contact with the third surfaces of the adjacent mold plates such that each groove forms a vacuum passage within the mold; or one or more fluid passages and a plurality of vacuum channels fluidly coupling the mold cavity and one of the corresponding fluid passages.

In another aspect, the present disclosure is directed to a method for creating a vacuum forming mold assembly. The method includes stacking a plurality of mold plates together. Each mold plate includes a first surface, a second surface spaced apart from the first surface, a third surface extending from the first surface to the second surface, and a fourth surface spaced apart from the third surface and extending from the first surface to the second surface. One or more of the plurality of mold plates define at least one of a plurality of grooves in the corresponding third surfaces extending from the corresponding first surfaces to the corresponding second surfaces, a plurality of grooves in the corresponding fourth surfaces extending from the corresponding first surfaces to the corresponding second surfaces, or one or more fluid passages and a plurality of vacuum channels fluidly coupled to one of the fluid passages. The method also includes removably coupling the plurality mold plates together after stacking to form a mold. The first surface of one or more of the plurality of mold plates is configured to partially define a top surface of the mold, with the mold cavity being configured to form a first component. The third surfaces of one or more of the mold plates being in contact with the fourth surfaces of the adjacent mold plates after coupling such that each groove forms a vacuum passage within the mold when the one or more mold plates define the plurality of grooves in the corresponding third surfaces or the corresponding fourth surfaces.

In a further aspect, the present disclosure is directed to a method for creating a vacuum forming mold assembly configured to form a rotor blade component of a wind turbine. The method includes providing a plurality of mold plates. Each mold plate includes a first surface, a second surface spaced apart from the first surface, a third surface extending from the first surface to the second surface, and a fourth surface spaced apart from the third surface and extending from the first surface to the second surface. The method also includes forming at least one of a plurality of grooves in the corresponding third surfaces extending from the corresponding first surfaces to the corresponding second surfaces, a plurality of grooves in the corresponding fourth surfaces extending from the corresponding first surfaces to the corresponding second surfaces, or one or more fluid passages and a plurality of vacuum channels fluidly coupled to one of the fluid passages. The method further includes stacking the plurality of mold plates together and removably coupling the plurality mold plates together after stacking to create a mold configured to form a portion of the rotor blade. The third surfaces of one or more of the mold plates are in contact with the fourth surfaces of the adjacent mold plates such that each groove forms a vacuum passage within the mold when the one or more mold plates define the plurality of grooves in the corresponding third surfaces or the corresponding fourth surfaces. Additionally, the method includes machining a mold cavity into the first surfaces of one or more of the plurality of mold plates.

These and other features, aspects and advantages of the present technology will become better understood with reference to the following description and appended claims.

The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
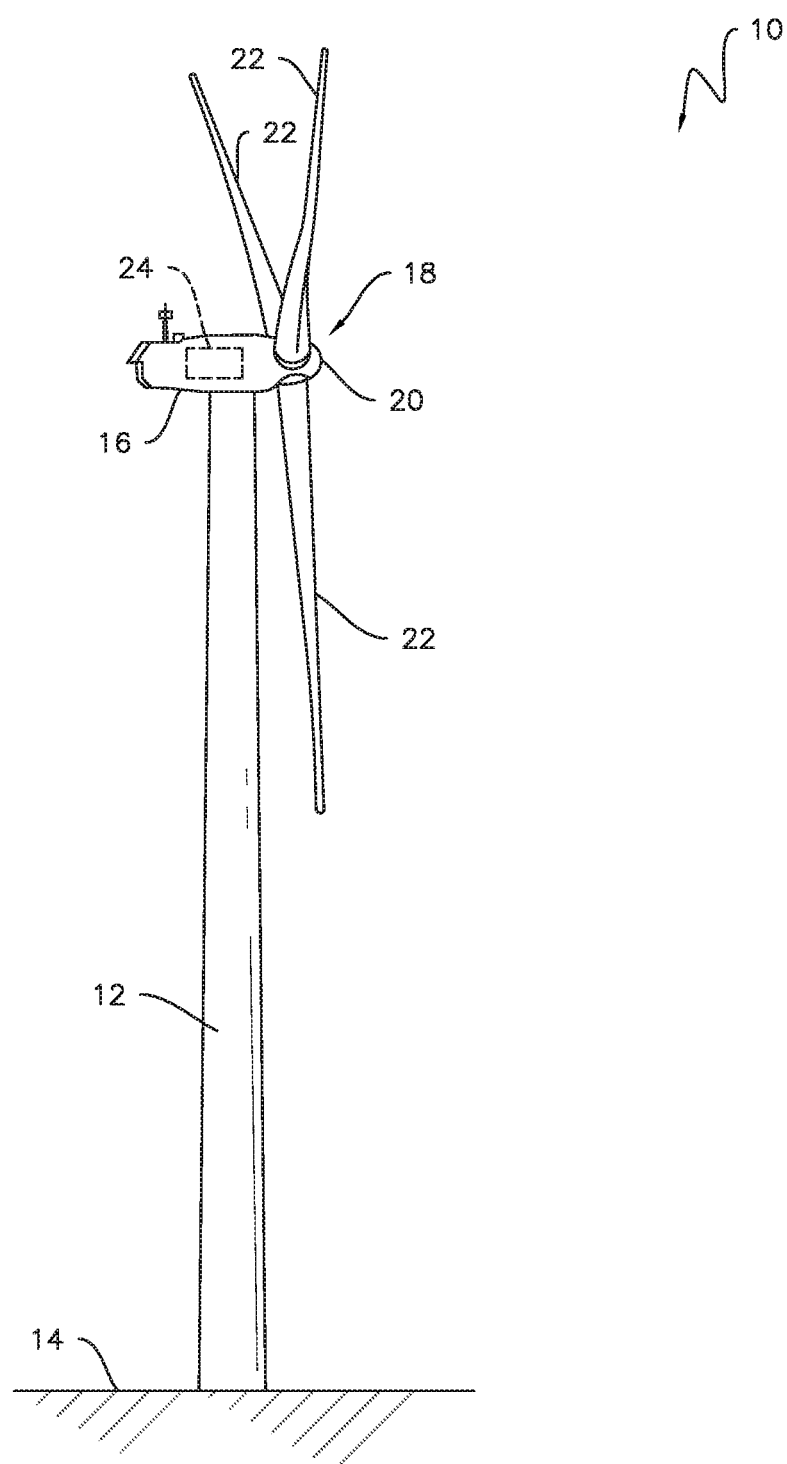
FIG. 1 is a perspective view of one embodiment of a wind turbine in accordance with aspects of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable mechanical energy, and subsequently, electrical energy. For instance, the hub 20 may be rotatably coupled to an electric generator 24 positioned within the nacelle 16.

Figure 2:
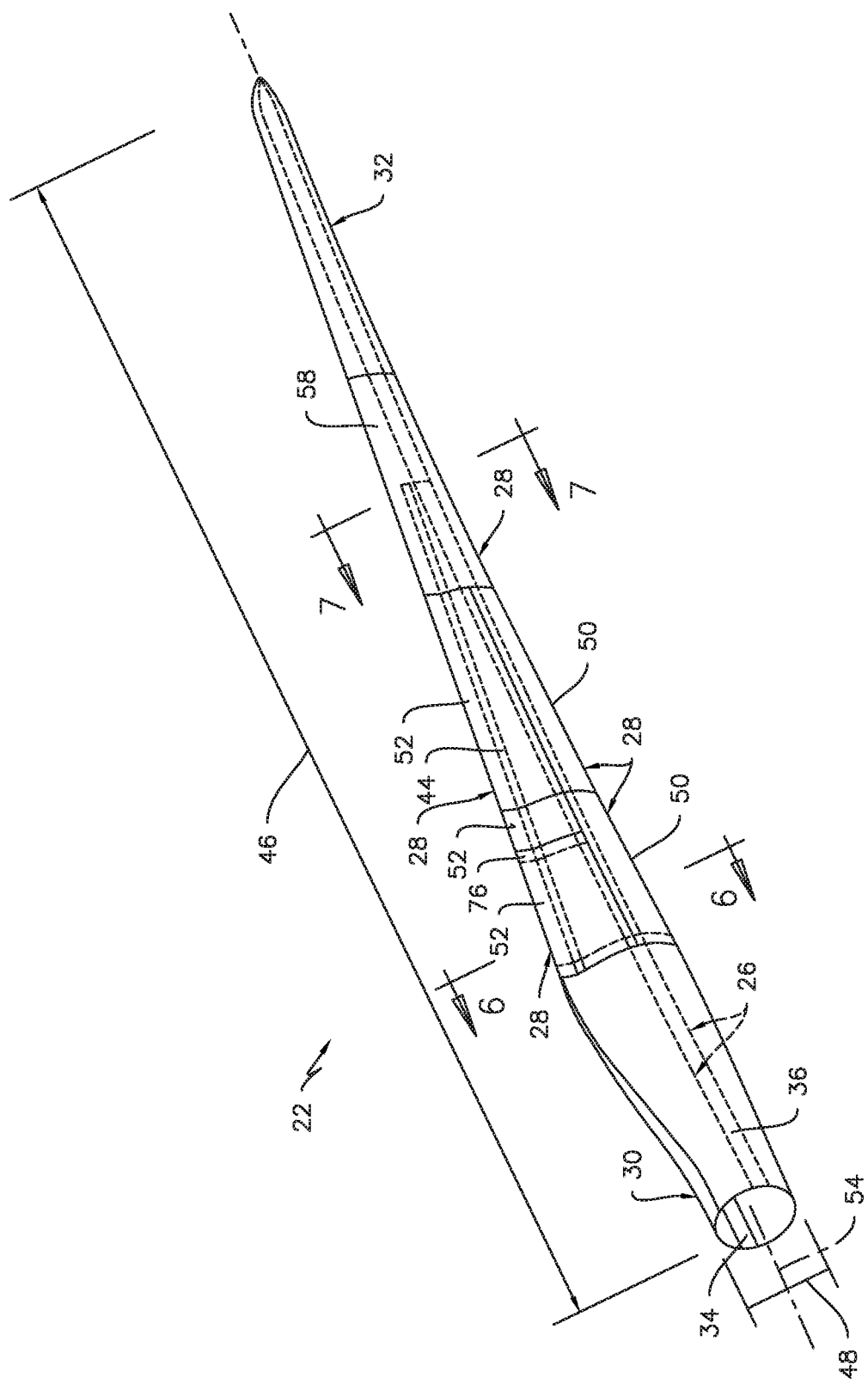
FIG. 2 is a perspective view of one embodiment of a modular rotor blade of a wind turbine in accordance with aspects of the present disclosure.
Figure 3:
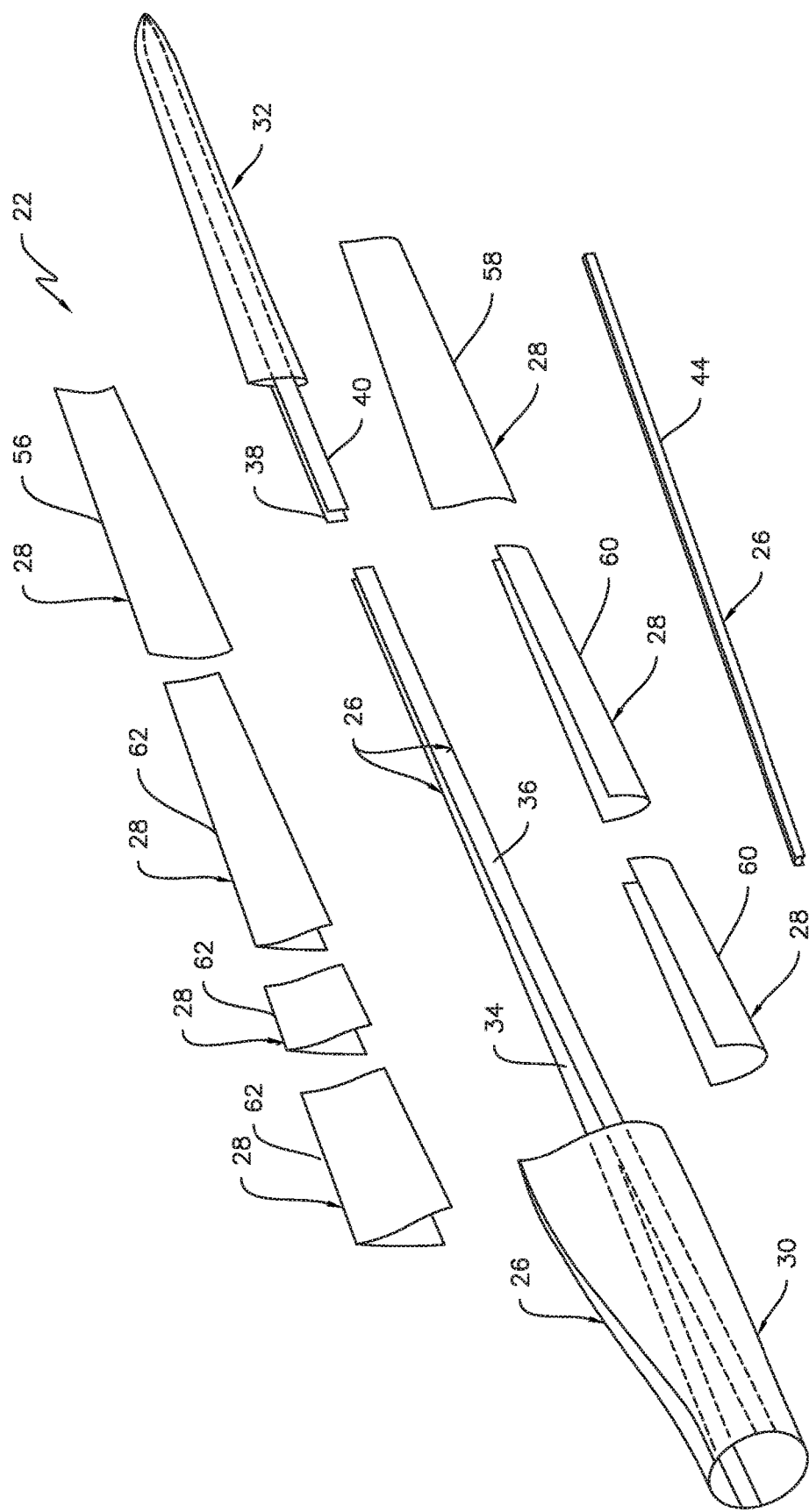
FIG. 3 is an exploded view of the modular rotor blade shown in FIG. 2 in accordance with aspects of the present disclosure.

Referring now to FIGS. 2 and 3, various views of a rotor blade 16 according to the present disclosure are illustrated. As shown, the illustrated rotor blade 22 has a segmented or modular configuration. It should also be understood that the rotor blade 22 may include any other suitable configuration now known or later developed in the art. As shown, the modular rotor blade 22 includes a main blade structure 26 constructed, at least in part, from a thermoset and/or a thermoplastic material and at least one blade segment 28 configured with the main blade structure 26. More specifically, as shown, the rotor blade 22 includes a plurality of blade segments 28. The blade segment(s) 28 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluoropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 22, and/or the desired weldability of the component.

Figure 6:
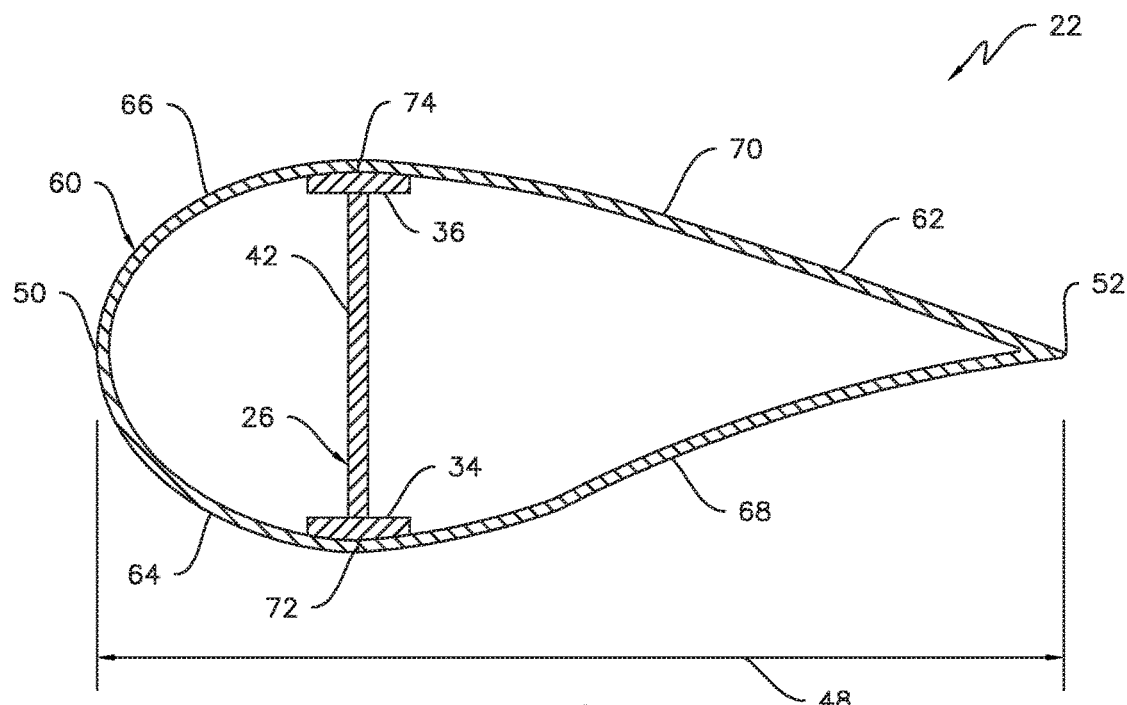
FIG. 6 is a cross-sectional view of the modular rotor blade of FIG. 2 in accordance with aspects of the present disclosure.

More specifically, as shown, the main blade structure 26 may include any one of or a combination of the following: a pre-formed blade root section 30, a pre-formed blade tip section 32, one or more one or more continuous spar caps 34, 36, 38, 40, one or more shear webs 42 (FIGS. 6-7), an additional structural component 44 secured to the blade root section 30, and/or any other suitable structural component of the rotor blade 22. Further, the blade root section 30 is configured to be mounted or otherwise secured to the hub 20 (FIG. 1). In addition, as shown in FIG. 2, the rotor blade 22 defines a span 46 that is equal to the total length between the blade root section 30 and the blade tip section 32. As shown in FIGS. 2 and 6, the rotor blade 22 also defines a chord 48 that is equal to the total length between a leading edge 50 of the rotor blade 22 and a trailing edge 52 of the rotor blade 22. As is generally understood, the chord 48 may generally vary in length with respect to the span 46 as the rotor blade 22 extends from the blade root section 30 to the blade tip section 32.

Figure 4:
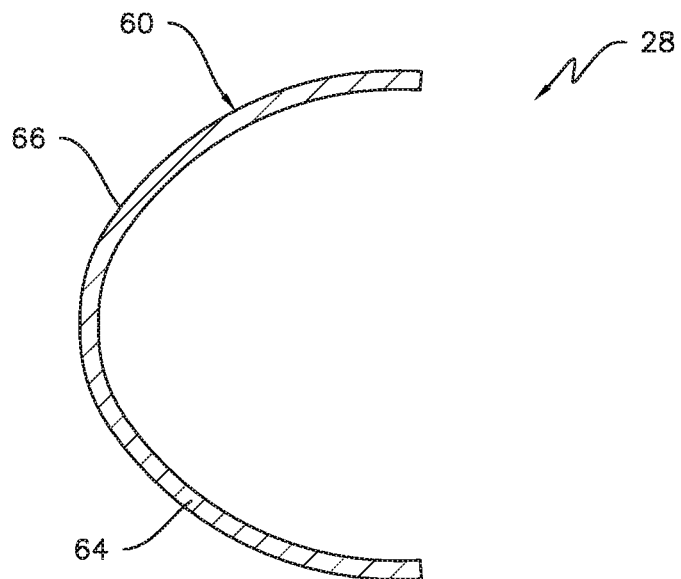
FIG. 4 is a cross-sectional view of one embodiment of a leading edge segment of a modular rotor blade in accordance with aspects of the present disclosure.

Referring particularly to FIGS. 2-4, any number of blade segments 28 or panels having any suitable size and/or shape may be generally arranged between the blade root section 30 and the blade tip section 32 along a longitudinal axis 54 in a generally span-wise direction. Thus, the blade segments 28 generally serve as the outer casing/covering of the rotor blade 22 and may define a substantially aerodynamic profile, such as by defining a symmetrical or cambered airfoil-shaped cross-section. In additional embodiments, it should be understood that the blade segment portion of the blade 22 may include any combination of the segments described herein and are not limited to the embodiment as depicted. In addition, the blade segments 28 may be constructed of any suitable materials, including but not limited to a thermoset material or a thermoplastic material optionally reinforced with one or more fiber materials. More specifically, in certain embodiments, the blade panels 28 may include any one of or combination of the following: pressure and/or suction side segments 56, 58, (FIGS. 2 and 3), leading and/or trailing edge segments 60, 62 (FIGS. 2-6), a non-jointed segment, a single-jointed segment, a multi-jointed blade segment, a J-shaped blade segment, or similar.

Figure 5:
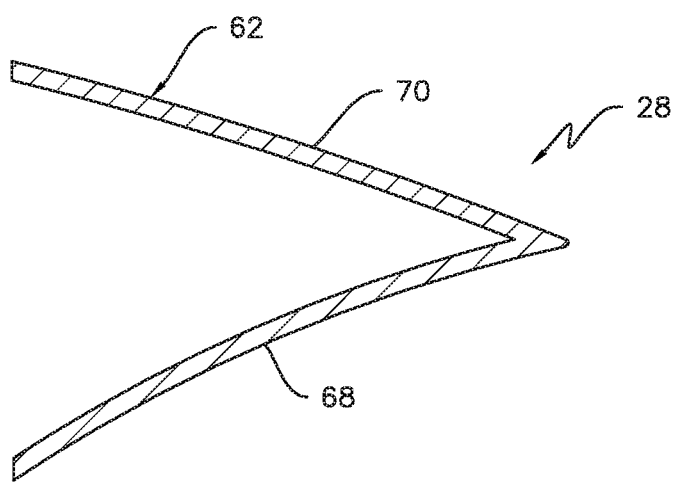
FIG. 5 is a cross-sectional view of one embodiment of a trailing edge segment of a modular rotor blade in accordance with aspects of the present disclosure.

More specifically, as shown in FIG. 4, the leading edge segments 60 may have a forward pressure side surface 64 and a forward suction side surface 66. Similarly, as shown in FIG. 5, each of the trailing edge segments 62 may have an aft pressure side surface 68 and an aft suction side surface 70. Thus, the forward pressure side surface 64 of the leading edge segment 60 and the aft pressure side surface 68 of the trailing edge segment 62 generally define a pressure side surface of the rotor blade 22. Similarly, the forward suction side surface 66 of the leading edge segment 60 and the aft suction side surface 70 of the trailing edge segment 62 generally define a suction side surface of the rotor blade 22. In addition, as particularly shown in FIG. 6, the leading edge segment(s) 60 and the trailing edge segment(s) 62 may be joined at a pressure side seam 72 and a suction side seam 74. For example, the blade segments 60, 62 may be configured to overlap at the pressure side seam 72 and/or the suction side seam 74. Further, as shown in FIG. 2, adjacent blade segments 28 may be configured to overlap at a seam 76. Thus, where the blade segments 28 are constructed at least partially of a thermoplastic material, adjacent blade segments 28 can be welded together along the seams 72, 74, 76, which will be discussed in more detail herein. Alternatively, in certain embodiments, the various segments of the rotor blade 22 may be secured together via an adhesive (or mechanical fasteners) configured between the overlapping leading and trailing edge segments 60, 62 and/or the overlapping adjacent leading or trailing edge segments 60, 62.

In specific embodiments, as shown in FIGS. 2-3 and 6-7, the blade root section 30 may include one or more longitudinally extending spar caps 34, 36 infused therewith. For example, the blade root section 30 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 32 may include one or more longitudinally extending spar caps 38, 40 infused therewith. More specifically, as shown, the spar caps 34, 36, 38, 40 may be configured to be engaged against opposing inner surfaces of the blade segments 28 of the rotor blade 22. Further, the blade root spar caps 34, 36 may be configured to align with the blade tip spar caps 38, 40. Thus, the spar caps 34, 36, 38, 40 may generally be designed to control the bending stresses and/or other loads acting on the rotor blade 22 in a generally span-wise direction (a direction parallel to the span 46 of the rotor blade 22) during operation of a wind turbine 10. In addition, the spar caps 34, 36, 38, 40 may be designed to withstand the span-wise compression occurring during operation of the wind turbine 10. Further, the spar cap(s) 34, 36, 38, 40 may be configured to extend from the blade root section 30 to the blade tip section 32 or a portion thereof. Thus, in certain embodiments, the blade root section 30 and the blade tip section 32 may be joined together via their respective spar caps 34, 36, 38, 40.

In addition, the spar caps 34, 36, 38, 40 may be constructed of any suitable materials, e.g. a thermoplastic or thermoset material or combinations thereof. Further, the spar caps 34, 36, 38, 40 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 34, 36, 38, 40 may be formed of the same pre-cured composites or different pre-cured composites. In addition, the pultruded components may be produced from rovings, which generally encompass long and narrow bundles of fibers that are not combined until joined by a cured resin.

Figure 7:
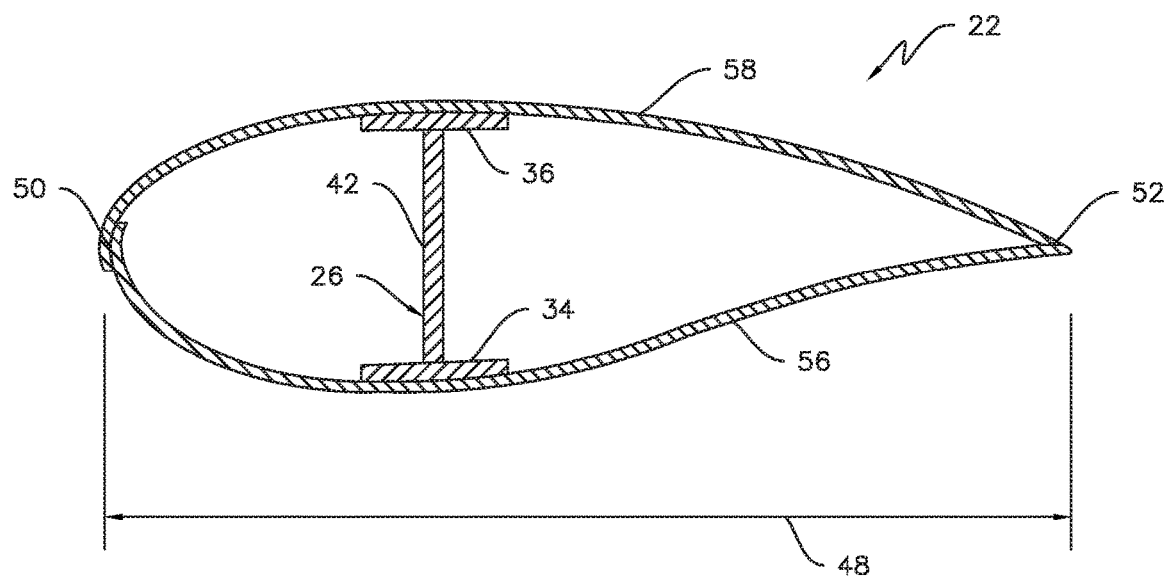
FIG. 7 is a cross-sectional view of the modular rotor blade of FIG. 2 in accordance with aspects of the present disclosure.

Referring to FIGS. 6-7, one or more shear webs 42 may be configured between the one or more spar caps 34, 36, 38, 40. More particularly, the shear web(s) 42 may be configured to increase the rigidity in the blade root section 30 and/or the blade tip section 32. Further, the shear web(s) 42 may be configured to close out the blade root section 30.

In addition, as shown in FIGS. 2 and 3, the additional structural component 44 may be secured to the blade root section 30 and extend in a generally span-wise direction so as to provide further support to the rotor blade 22. For example, the structural component 44 may be configured according to U.S. application Ser. No. 14/753,150 filed Jun. 29, 2015 entitled "Structural Component for a Modular Rotor Blade" which is incorporated herein by reference in its entirety. More specifically, the structural component 44 may extend any suitable distance between the blade root section 30 and the blade tip section 32. Thus, the structural component 44 is configured to provide additional structural support for the rotor blade 22 as well as an optional mounting structure for the various blade segments 28 as described herein. For example, in certain embodiments, the structural component 44 may be secured to the blade root section 30 and may extend a predetermined span-wise distance such that the leading and/or trailing edge segments 60, 62 can be mounted thereto.

FIGS. 8-11 illustrate one embodiment of a mold assembly 100 for vacuum forming various thermoplastic components. As shown, the mold assembly 100 is configured to form a first component 102. In the illustrated embodiment, the first component 102 is one of the pressure side segments 56 of the rotor blade 22 of the wind turbine 10. Nevertheless, in alternative embodiments, the first component 102 may be another suitable component of one of the rotor blades 22, such as another one of the blade segments 28. For example, in such embodiments, the first component 102 may be one of the suction side segments 58, the leading edge segments 60, or the trailing edge segments 62. In further embodiments, the first component 102 may be any thermoplastic component for use in any suitable application, including applications outside of wind turbines. In one embodiment, the mold assembly 100 may be configured for placement within a bed of an additive manufacturing device (e.g., three-dimensional printer).

As illustrated in FIGS. 8-11, the mold assembly 100 defines various directions. More specifically, in several embodiments, the directions of the mold assembly 100 may be defined relative to the particular component of which the mold assembly 100 is configured to form (e.g., the first component 102). As such, in the illustrated embodiment, the mold assembly 100 defines span-wise direction (e.g., as indicated by arrow 104 in FIGS. 8-11) extending between a root side 106 of the mold assembly 100 and a tip side 108 of the mold assembly 100. The mold assembly 100 also defines chord-wise direction (e.g., as indicated by arrow 110 in FIGS. 8 and 9) extending between a leading edge side 112 of the mold assembly 100 and a trailing edge side 114 of the mold assembly 100. Furthermore, the mold assembly 100 defines vertical direction (e.g., as indicated by arrow 116 in FIGS. 9 and 10) extending between a bottom side 118 of the mold assembly 100 and a top side 120 of the mold assembly 100. In alternative embodiments, however, the mold assembly 100 may define other directions in addition to or in lieu of the span-wise, chord-wise, and vertical directions 104, 110, 116 depending on the particular configuration of the thermoplastic component.

As shown, the mold assembly 100 includes a plurality of spaced apart support plates 122. In general, the support plates 122 are configured to support a mold 124 of the mold assembly 100 relative to a base 126 (FIG. 16) of the mold assembly 100. In this respect, the each support plate 122 may have a beam-like configuration. Although the support plates 122 are shown as having a rectangular cross-section in the illustrated embodiment, the support plates 122 may have any suitable cross-section in other embodiments. Furthermore, in the illustrated embodiment, the support plates 122 may be spaced apart along the span-wise direction 104. However, in alternative embodiments, the support plates 122 may be spaced apart along the chord-wise direction 110 or any other suitable direction. Additionally, although the mold assembly 100 is shown as having four support plates 122, the mold assembly 100 may include any suitable number of support plates 122.

The mold assembly 100 also includes a plurality of mold plates 128. As will be described in greater detail below, the mold plates 128 are removably coupled together to form the mold 124 of the mold assembly 100. In the embodiment illustrated in FIGS. 8-11, the mold assembly 100 includes six mold plates 128. Nevertheless, in alternative embodiments, the mold assembly 100 may include any suitable number of mold plates 128. Furthermore, in several embodiments, the mold plates 128 may be formed from aluminum and any other suitable material.

Figure 12:
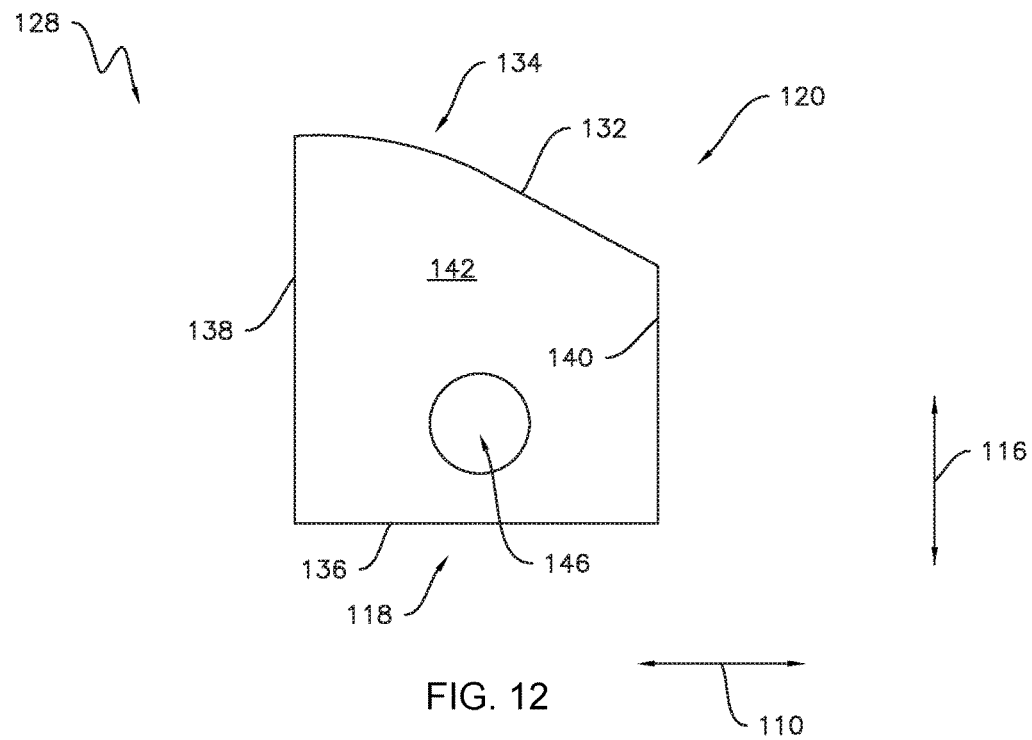
FIG. 12 is a side view of one embodiment of a mold plate in accordance with aspects of the present disclosure, particularly illustrating various surfaces of the mold plate.
Figure 13:
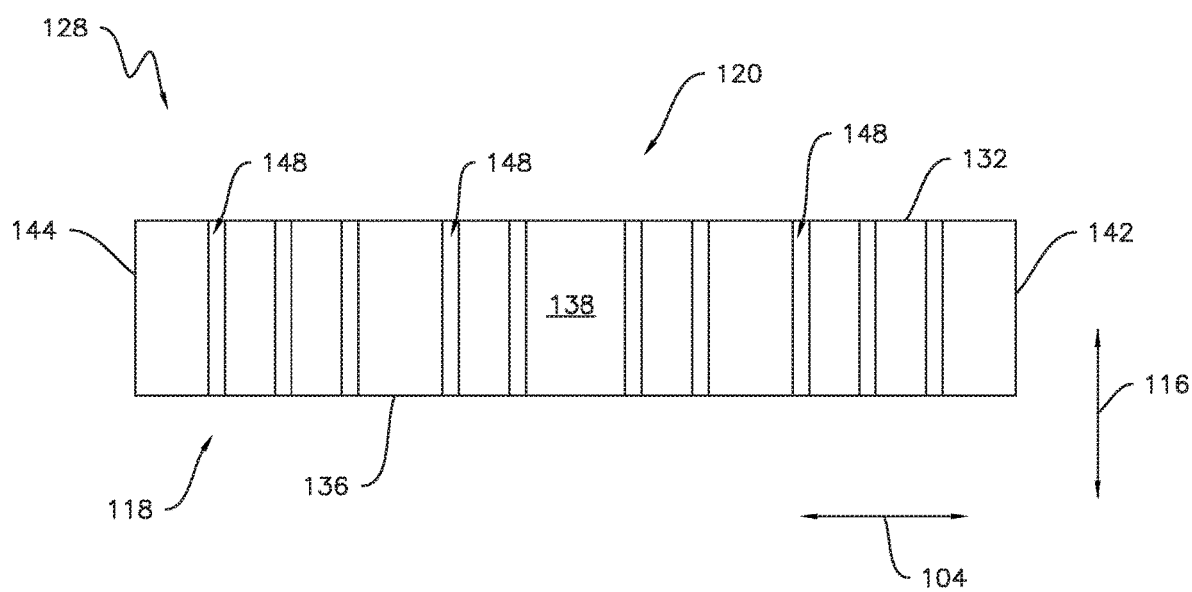
FIG. 13 is a front view of the mold plate shown in FIG. 12 in accordance with aspects of the present disclosure, particularly illustrating the mold plate defining a plurality of grooves.

FIGS. 12 and 13 illustrate one of the mold plates 128 in greater detail. As shown, each mold plate 128 includes a first surface 132 at least partially defining a top surface of the mold including a mold cavity 134 of the mold 124 and a second surface 136 spaced apart from the first surface 132. In one embodiment, the first surface 132 of the mold plate 128 may be positioned at or proximate the top side 120 of the mold assembly 100, while the second surface 134 of the mold plate 128 may be positioned at or proximate to the bottom side 118 of the mold assembly 100. Each mold plate 128 also includes a third surface 138 extending from the first surface 132 to the second surface 136, and a fourth surface 140 spaced apart in the chord-wise direction 110 from the third surface 138 and extending from the first surface 132 to the second surface 136. Furthermore, each mold plate 128 also includes a fifth surface 142 extending from the first surface 132 to the second surface 136, and a sixth surface 144 spaced apart from the fifth surface 142 in the span-wise direction 104 and extending from the first surface 132 to the second surface 136.

Figure 9:
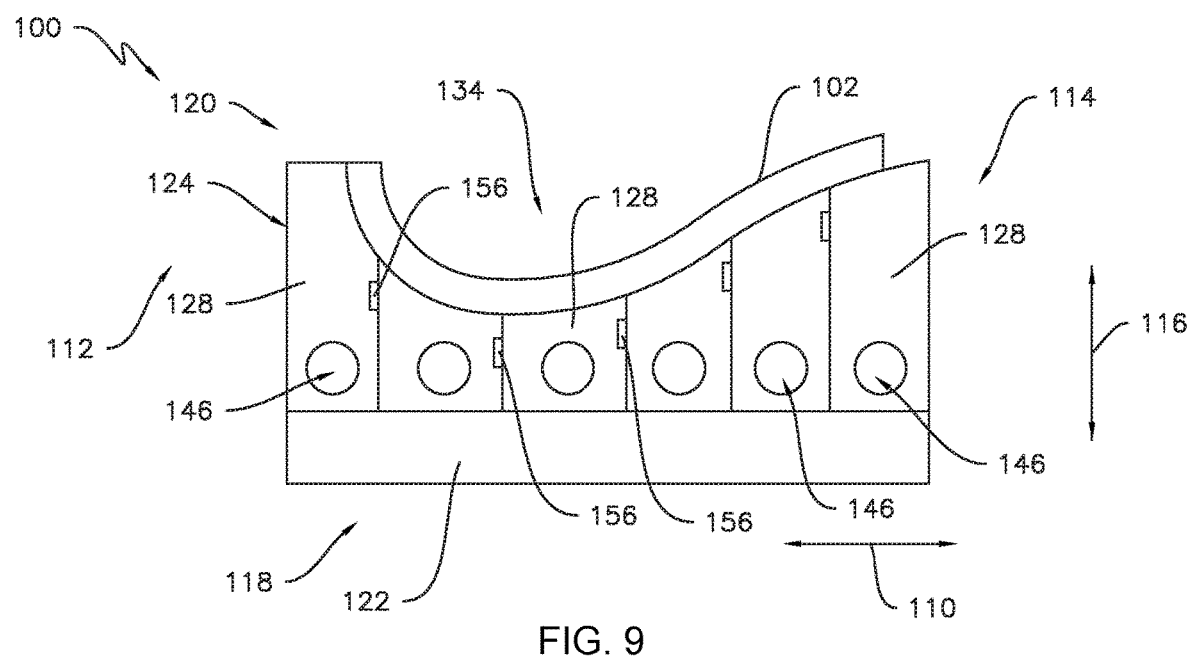
FIG. 9 is a side view of the vacuum forming mold assembly shown in FIG. 8 in accordance with aspects of the present disclosure, particularly illustrating the plurality of mold plates of the mold assembly defining a mold cavity.
Figure 10:
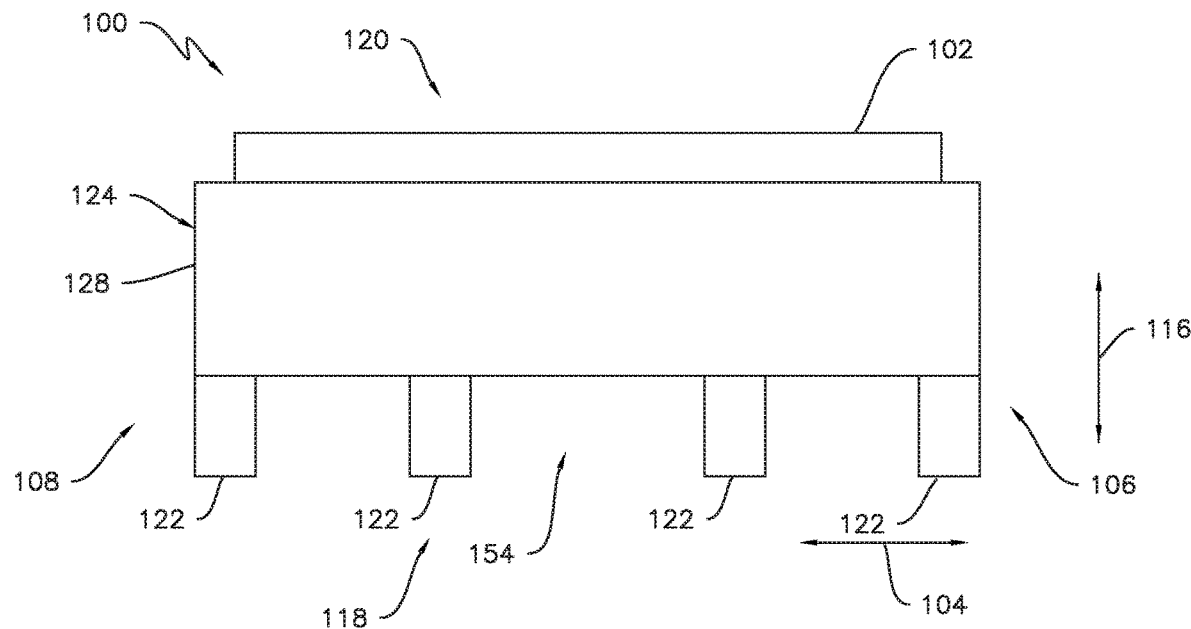
FIG. 10 is a rear view of the vacuum forming mold assembly shown in FIGS. 8 and 9 in accordance with aspects of the present disclosure, particularly illustrating a plurality of support plates of the mold assembly.

As illustrated in FIGS. 9 and 12, one or more of the mold plates 128 may define a fluid passage 146 extending therethrough. In general, a heating fluid may flow through the fluid passages 146 in the mold plates 128 to heat the mold 124 for vacuum forming a thermoplastic sheet. Although, a coolant may flow through the fluid passages 146 to cool the mold 124 in certain embodiments. In one embodiment, the fluid passages 146 may extend along the span-wise direction 104 from the fifth surface 142 of the corresponding mold plate 128 to the sixth surface of the corresponding mold plate 128. As such, the fluid passages 146 may be spaced apart from each other along the chord-wise direction 110. Nevertheless, in alternative embodiments, the fluid passages 146 may extend through the mold plates 128 in any suitable manner. Further embodiments of the mold plate 128 may define a plurality of the fluid passages 146 or no fluid passages 146 at all. In further embodiments, an external heater (not shown) coupled to the second surfaces 136 of the mold plates 128 may heat the mold 124 as desired.

Referring now to FIG. 13, each mold plate 128 defines a plurality of grooves 148. As shown, the grooves 148 extend along the vertical direction 116 from the first surface 132 of the corresponding mold plate 128 to the second surface 136 of the corresponding mold plate 128. As shown, the grooves 148 are spaced apart from each other along the span-wise direction 104. The grooves may be defined in the third surface 138 or the fourth surface 140. Furthermore, in one embodiment, the grooves 148 may have a semi-circular cross-section. Although, in alternative embodiments, the grooves 148 may have any suitable cross-section.

Figure 14:
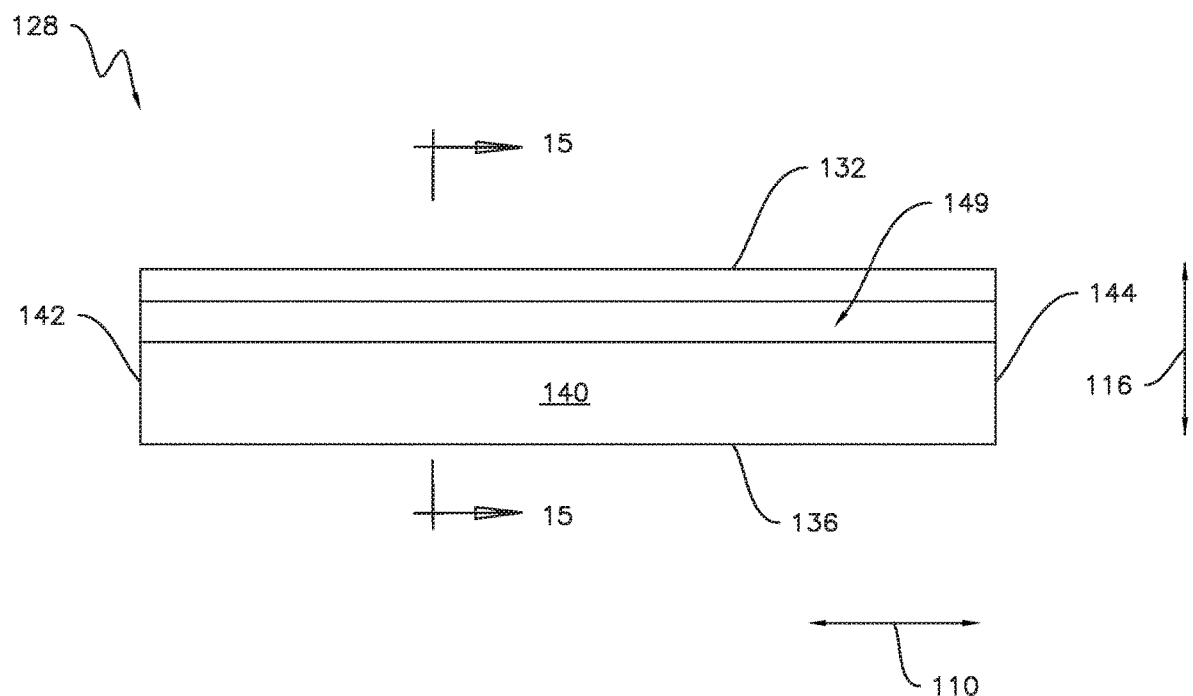
FIG. 14 is a side view of another embodiment of a mold plate in accordance with aspects of the present disclosure, particularly illustrating a plurality of fluid passages.
Figure 15:
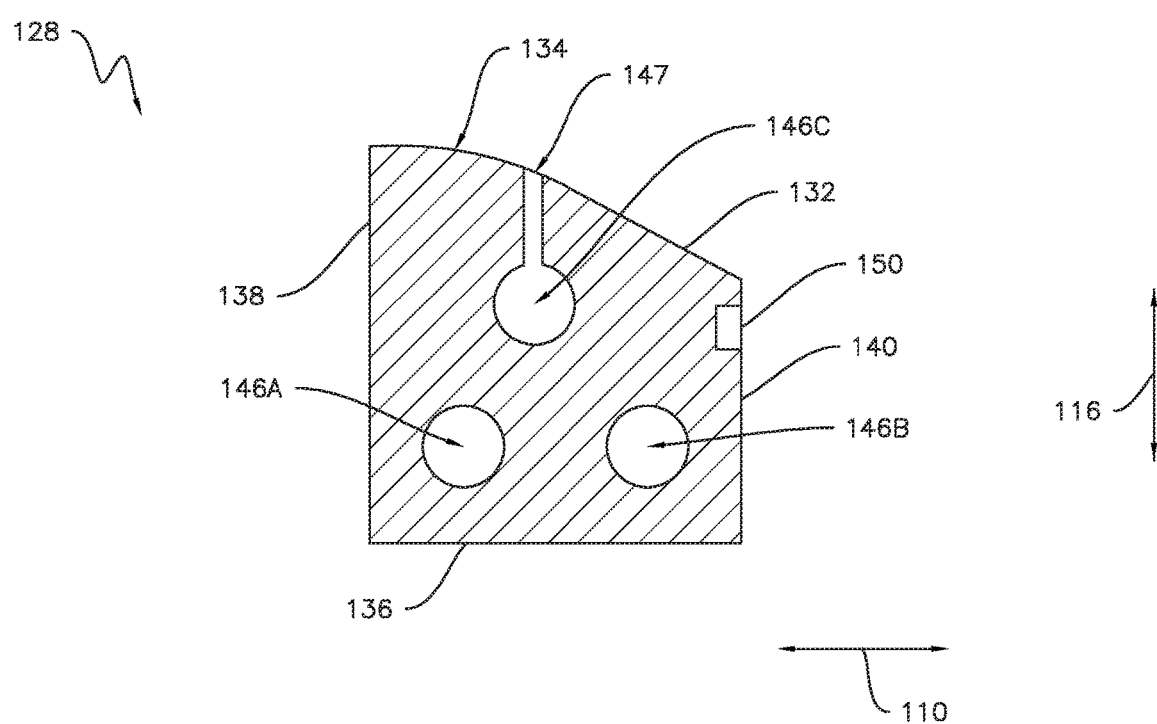
FIG. 15 is a cross-sectional view of the mold plate shown in FIG. 14 in accordance with aspects of the present disclosure, particularly illustrating the mold plate defining a slot.

FIGS. 14 and 15 illustrate another embodiment of one of the mold plates 128. As shown, the mold plate 128 defines three fluid passages 146A, 146B, 146C. For example, the fluid passage 146A may be coupled to a heating fluid source (not shown) such that a heating fluid may flow therethrough to heat the mold 124 for vacuum forming a thermoplastic sheet. The fluid passage 146B may be fluidly coupled to a coolant source (not shown) such that a coolant may flow therethrough to cool the mold 124. The fluid passage 146C may be fluid coupled to a vacuum pump 158 (FIG. 16) such that a vacuum is present therein. As such, the mold plate 128 may define a plurality of vacuum channels 147 the fluidly couple the mold cavity 134 and the fluid passage 146. The fluid passages 146 may extend along the span-wise direction 104 from the fifth surface 142 of the corresponding mold plate 128 to the sixth surface of the corresponding mold plate 128. As such, the fluid passages 146 may be spaced apart from each other along the chord-wise direction 110. Nevertheless, in alternative embodiments, the fluid passages 146 may extend through the mold plates 128 in any suitable manner. In further embodiments, the mold plates 128 may define only some of the fluid passages 146A-C. For example, one mold plate 126 may define the fluid passage 146A, an adjacent mold plate may define the fluid passage 146B, and a further adjacent mold plate 146C may define the fluid 146C. This arrangement may be repeated throughout the mold assembly 100.

In certain embodiments, such as embodiments that include the vacuum channels 147, it may be desirable to seal between one or more adjacent pairs of the mold plates 128. In this respect, as shown in FIGS. 14 and 15, one or more of the mold plates 128 be define a slot 149 extending along its third or fourth surfaces 138, 140. The slot 149 may be configured to receive or otherwise provide clearance for a sealant or adhesive 150 that seals the adjacent mold plates 128. In particular, the sealant or adhesive 150 may prevent vacuum leaks primarily through the ends of the mold plates 128 or portions of the mold plates 128 that do not define the mold cavity 128. Although the slot 149 is illustrated as extending along the entirety of the third surface 140 from the fifth surface 142 to the sixth surface 144, the slot 149 may also extend along only a portion of the third or fourth surface 138, 140.

Figure 8:
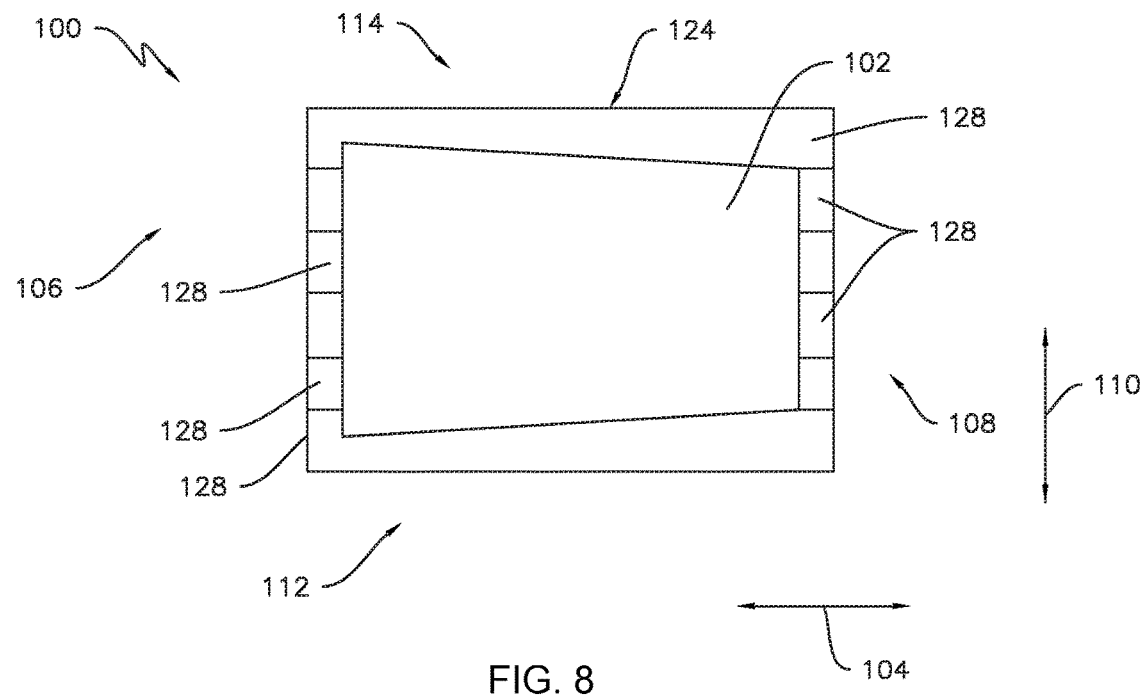
FIG. 8 is a top view of one embodiment of a vacuum forming mold assembly for use in forming a shell of a rotor blade in accordance with aspects of the present disclosure, particularly illustrating a plurality of mold plates partially forming the mold assembly.
Figure 11:
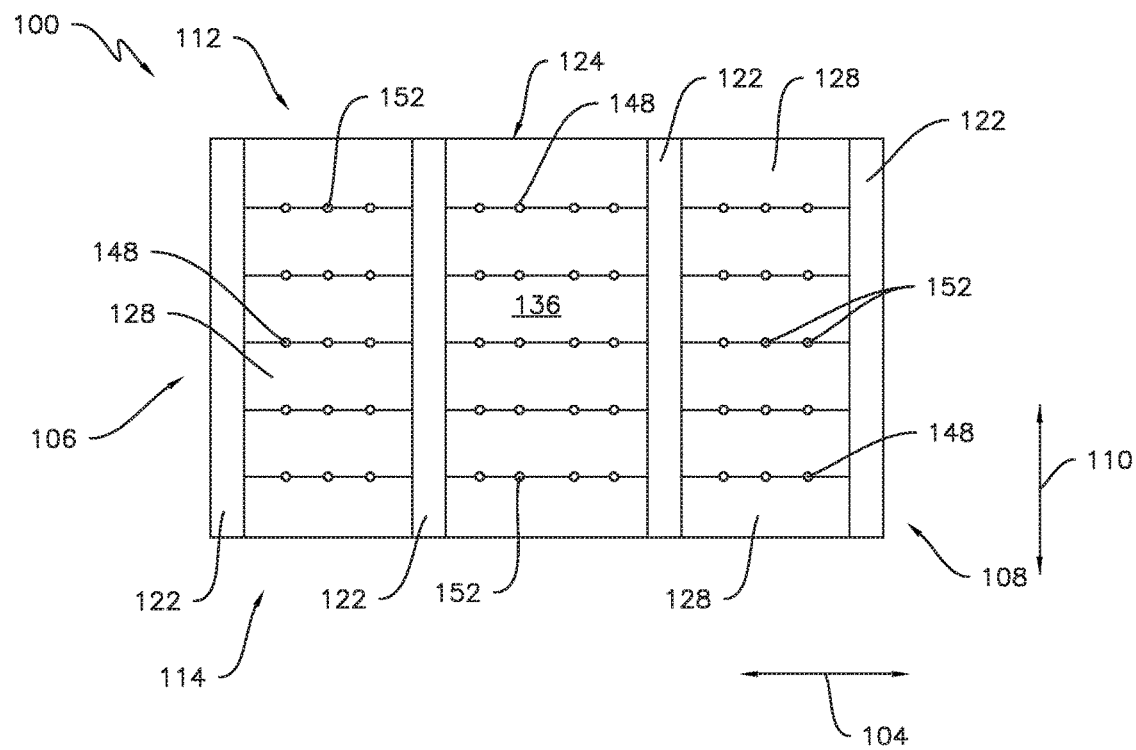
FIG. 11 is a bottom view of the vacuum forming mold assembly shown in FIGS. 8-10 in accordance with aspects of the present disclosure, particularly illustrating a plurality of vacuum passages defined by the mold assembly.

As shown in FIGS. 8, 9, and 11, the mold plates 128 are stacked together such that the third surface 138 of one or more of the mold plate 128 is in contact with the fourth surface 140 of the adjacent mold 128. As shown, the mold plates 128 are generally oriented or arranged perpendicular to the support plates 122. For example, as illustrated, in one embodiment, the mold plates 128 may be stacked and coupled together in the chord-wise direction 110. Nevertheless, in alternative embodiments, the mold plates 128 may be stacked or arranged in any suitable direction. In one embodiment, as described above, the sealant or adhesive 150 (FIG. 15), such as silicone, may be applied to the fourth surfaces 140 of the mold plates 128 to create a seal between each adjacent pair of mold plates 128. In general, the sealant 150 should be applied such that the sealant 150 does not obstruct the grooves 148. Once stacked together, the first surfaces 132 of the mold plates 128 may be machined (e.g., via milling, etc.) to collectively define the mold cavity 134. In embodiments where the mold assembly 100 is configured to form one the blade segments 28, the mold cavity 134 and the associated first surfaces 132 of each of a plurality of mold plates 124 have a shape associated with that blade segment 28. Furthermore, as illustrated in FIG. 11, each of the grooves 148 defined the mold plates 128 forms a vacuum passage 152 in the mold 124. Specifically, the fourth surface of one or more of the mold plates 128 enclose a portion of each groove 148 defined by the third surfaces of the adjacent mold plates 128. As such, each groove 148 forms a vacuum passage 152 providing fluid communication between a vacuum chamber 154 (FIG. 16) of the mold assembly 100 and the mold cavity 134. That is, each groove 148 provides clearance to form the corresponding vacuum passage 152 when the third surfaces 138 of one or more of the mold plates 128 are in contact with the fourth surfaces 140 of each adjacent mold plates 128.

Figure 19:
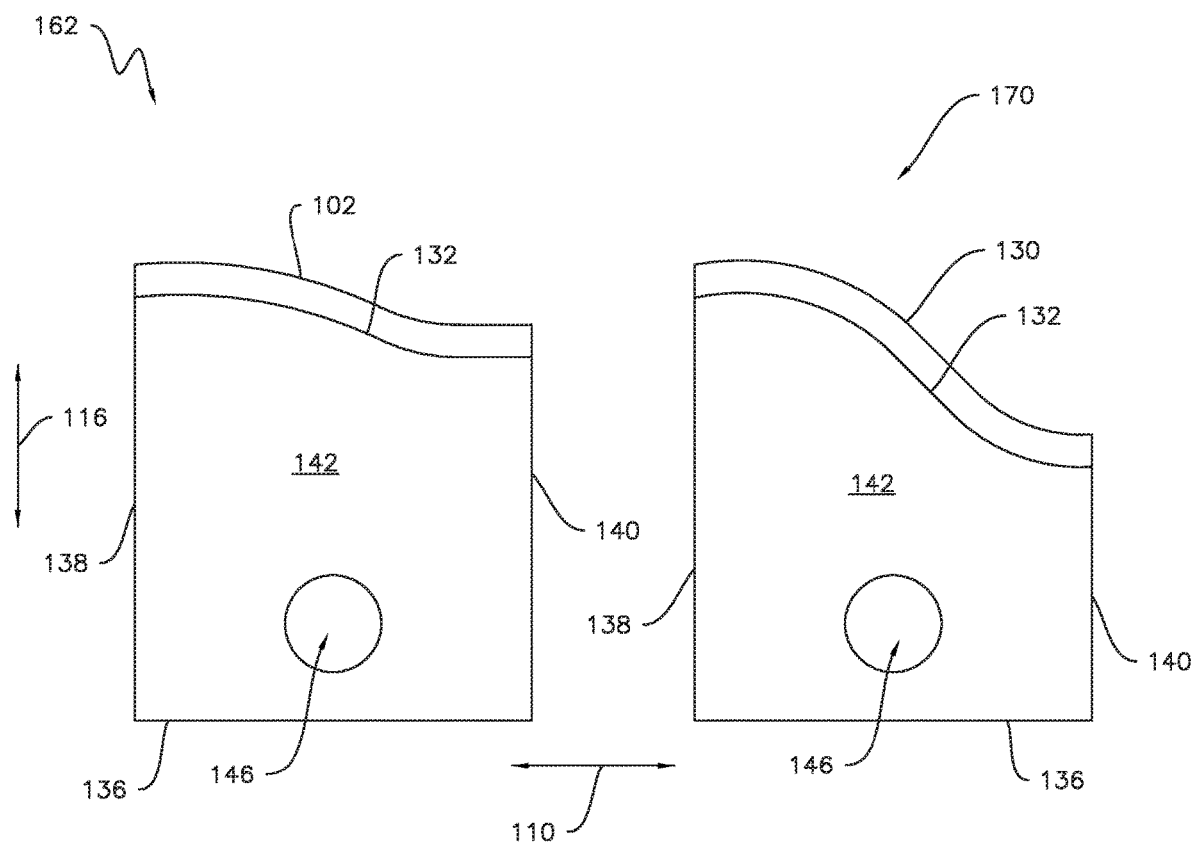
FIG. 19 is a side view of a first mold plate removed from a mold assembly before modification and a second mold plate after modification in accordance with aspects of the present disclosure.

As mentioned above, the plurality of mold plates 128 are removably coupled together to form the mold 124. For example, in several embodiments, the mold plates 128 are removably coupled together via suitable fasteners, such as T-bolts. In another embodiment, the mold plates 128 are removably coupled together via a suitable snap fit connection. Nevertheless, any other suitable coupling device may removably couple the mold plates 128 together. In this respect, and as will be described in greater detail below, removable coupling of the mold plates 128 permits removal of certain mold plates 128 from the mold 124. In one embodiment, each mold assembly 100 may include one or more separation features, such as the illustrated notches 156, which facilitate separation of the decoupled mold plates 128. The removed mold plates 128 may be modified and reinstalled into the mold 124 such that the mold 124 is configured to produce a different component, such as a second component 130 (FIG. 19). Alternatively, different mold plates 128 may be installed into to the mold 124 in place of the removed mold plates 128 such that mold 124 is similarly configured to produce a different component, such as the second component 130. In this respect, the mold 124 may be easily modified to produce the second component 130, thereby eliminating the need for a new mold. Additionally, the mold 134 may be removably coupled to the plurality of support plates 122, such via suitable fasteners.

Figure 16:
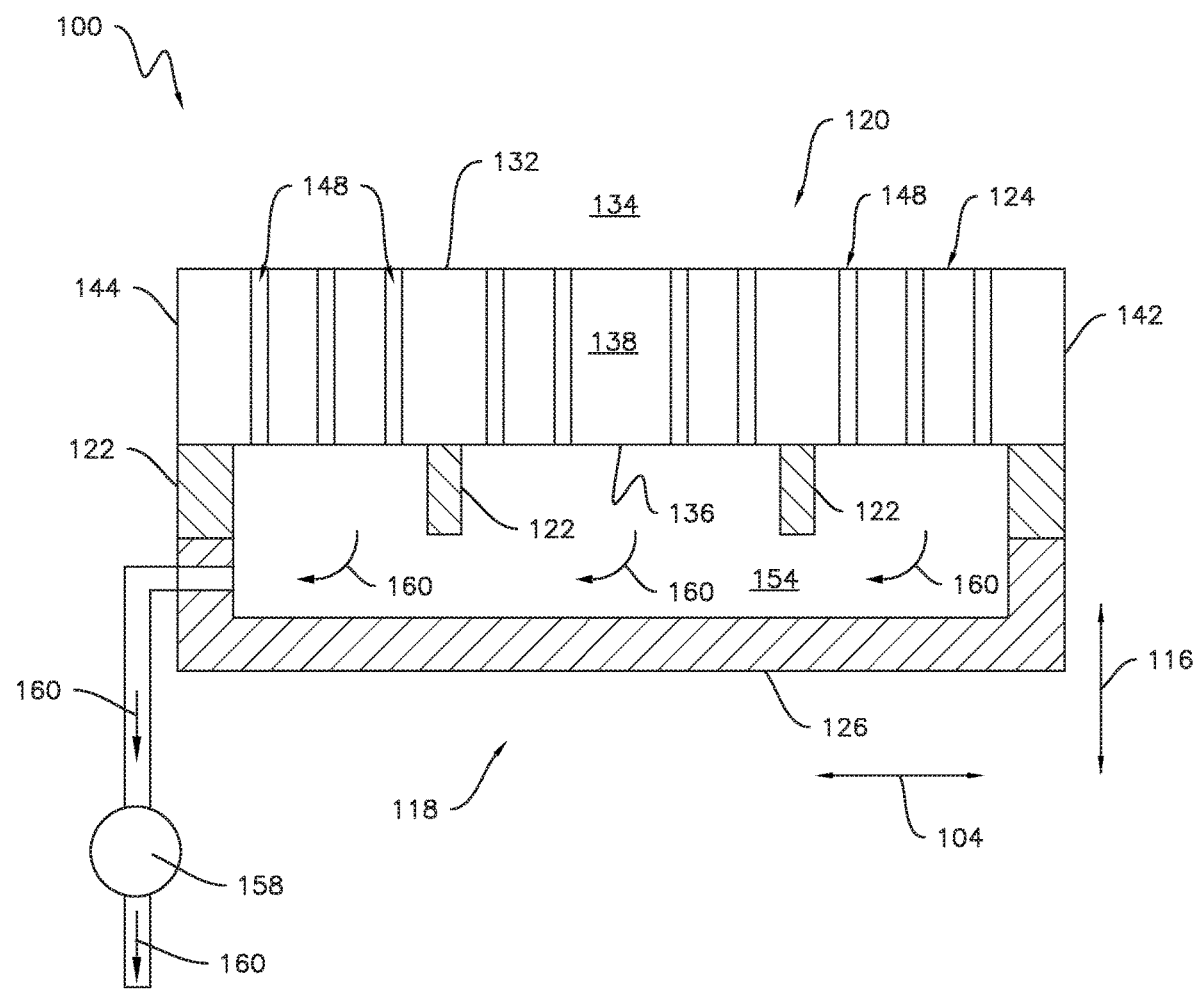
FIG. 16 is a cross-sectional view of the vacuum forming mold assembly shown in FIGS. 8-11 in accordance with aspects of the present disclosure, particularly illustrating a plurality of vacuum passages in fluid communication with a vacuum chamber defined the mold assembly.

Referring now to FIG. 16, the mold assembly 100 defines the vacuum chamber 154. More specifically, in several embodiments, the vacuum chamber 154 is defined by the mold 124 (e.g., the second surfaces 136 of the mold plates 128), the support plates 122, and the base 126. In this respect, the vacuum cavity 154 may be positioned vertically below the mold cavity 134. As shown, the vacuum chamber 154 is in fluid communication with the vacuum passages 152, the mold cavity 134, and a vacuum pump 158 or any other suitable vacuum source. In operation, the vacuum pump 158, when activated, creates a vacuum in the mold cavity 154, which causes a thermoplastic sheet placed on the mold 124 to conform shape of the mold cavity 134 (i.e., conform to the first surfaces 132 of the mold plates 128). More specifically, the vacuum pump 158 creates the vacuum in the mold cavity 134 by drawing air (e.g., as indicated by arrows 160 in FIG. 16) out of the mold cavity 134, through the vacuum passages 148, and into the vacuum chamber 154. The air 160 then flows out of the vacuum chamber 154 and through the vacuum pump 158 before exiting the mold assembly 100.

The mold assembly 100 may be machined such that the mold cavity 134 is configured to form a different component, such as the second component 130. For example, in one embodiment, a portion of one or more of the first surfaces 132 of the plurality of mold plates 128 may be machined (e.g., via milling, etc.) to modify the mold cavity 134 such that the mold cavity 134 is configured to form the second component 130. This machining may be performed when the plurality of mold plates 128 are removably coupled together such that the mold plates 128 need not be decoupled. In general, it is not necessary to reform the vacuum channels 147 or the grooves 148 during such machining as the vacuum channels 147 or the grooves 148 simply become shorter. However, when the mold plates 128 do not include sufficient material (e.g., are too thin along the vertical direction 116), certain mold plates 128 may be replaced to modify the mold cavity 134 as described below.

As mentioned above, one or more mold plates 128 may be removed from the mold 124 and modified or replaced with new mold plate(s). In this respect, the new and/or modified mold plates may configure the mold assembly 100 to form the second component 130. As with the first component 102, the second component 130 may be a suitable component of one of the rotor blades 22, such as one of the blade segments 28. For example, in such embodiments, the second component 130 may be one of the pressure side segments 56, the suction side segments 58, the leading edge segments 60, or the trailing edge segments 62. In one embodiment, the second component 130 may be a modified version of the first component 102, such as a new design of the first component 102. Nevertheless, in alternative embodiments, the second component 130 may be any thermoplastic component for use in any suitable application, including applications outside of wind turbines.

Figure 17:
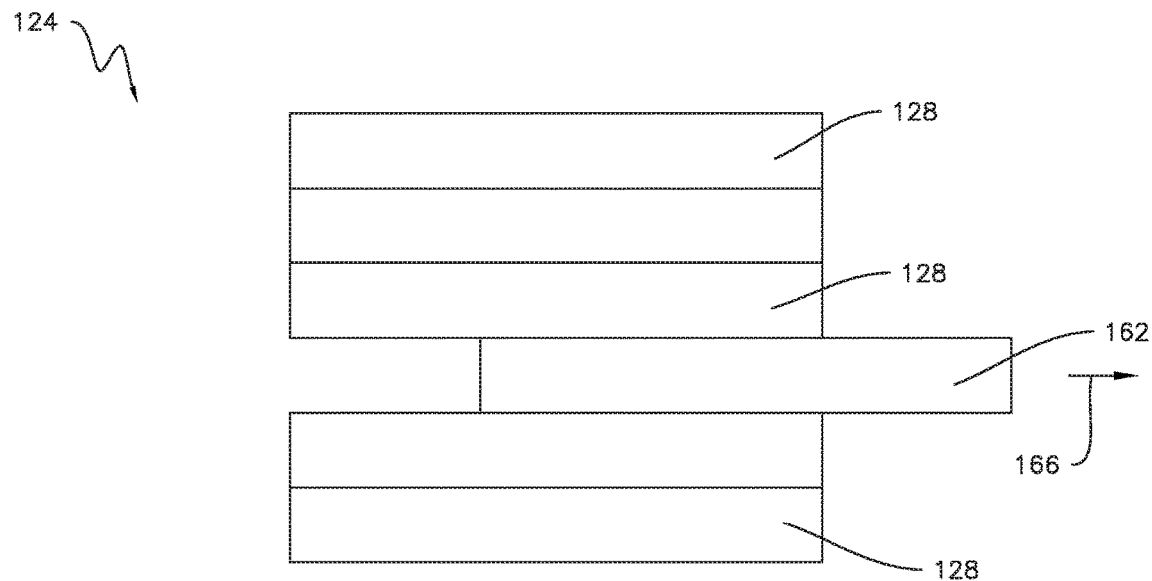
FIG. 17 is a top view of one embodiment of a vacuum forming assembly in accordance with aspects of the present disclosure, particularly illustrating removal of a first mold plate of the plurality of mold plates of the mold assembly.
Figure 18:
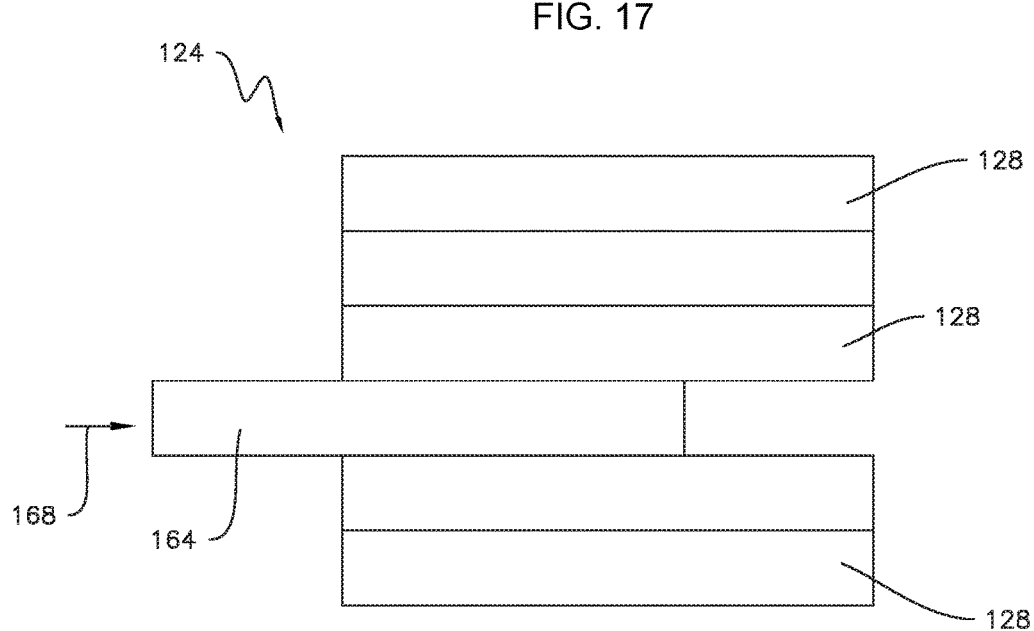
FIG. 18 is a top view of one embodiment of a vacuum forming assembly in accordance with aspects of the present disclosure, particularly illustrating installation of a replacement mold plate into the mold assembly.

In certain embodiments, as illustrated in FIGS. 17-19, an original mold plate 162 of the plurality of mold plates 128 may be removed from the mold 124 and replaced with a replacement mold plate 164. More specifically, the original mold plate 162 may be decoupled from the mold 124, such as by loosening and/or removing the associated fasteners. After decoupling, the original mold plate 162 may be removed (e.g., as indicated by arrow 166) from the mold 124. In the embodiment shown, the original mold plate 162 is generally configured to form the first component 102. That is, the first surface 132 of the original mold plate 162 may conform to the shape of a portion of the first component 102. After removal of the original mold plate 162, the replacement mold plate 164 is positioned (e.g., as indicated by arrow 168) within the mold 124 in place of the removed original mold plate 162 and coupled to the adjacent mold plates 128. In general, the replacement mold plate 164 configures the mold 124 to form the second component 130. That is, the first surface 132 of the replacement mold plate 166 may conform to the shape of a portion of the second component 130. Any number of the plurality of mold plates 128 including all of the mold plates 128 may be removed and replaced with replacement mold plates as is necessary to modify the mold 124 such that it is able to produce the second component 130.

Referring particularly to FIG. 19, in several embodiments, the removed original mold plate 162 may be modified after removal from the mold 124. More specifically, the original mold plate 162 may be modified to form a modified mold plate 170. For example, in one embodiment, the original mold plate 162 may be modified by removing material from the first surface 132 of the original mold plate 162, such as via a suitable machining operation (e.g., milling, waterjetting, etc.). After the material removal process, the first surface 132 of the modified mold plate 170 may conform to the shape of a portion of the second component 130. The modified mold plate 170 may then be positioned within the mold 124 and removably coupled to the adjacent mold plates 128 such that the mold 124 is configured to form the second component 130. If the original mold plate 162 is to be modified, it should have a sufficient thickness along the vertical direction 116 such that, after material removal, the modified mold plate 170 has sufficient strength and stiffness for use in a vacuum forming operation. Furthermore, after material removal, the modified mold plate 170 should have sufficient material stock remaining such that none of the fluid passages 146, 146A, 146B, 146C are not exposed through the first surface 132. Any number of the plurality of mold plates 128 including all of the mold plates 128 may be removed and modified as is necessary to modify the mold 124 such that it is able to produce the second component 130. Furthermore, in one embodiment, certain mold plates 128 may be removed and modified, while other mold plates 128 may be removed and replaced with replacement mold plates 164.

In certain embodiments, the mold assembly 100 may be incorporated into or otherwise combined with other types of mold assemblies or mold assembly portions. For example, the mold assembly 100 may be used to form portions of the rotor blade 22 positioned proximate to its tip, while another mold assembly having a different configuration (e.g., one that does not require machining its mold cavity) may be used to form the portions of the rotor blade 22 proximate to its mid-span. Nevertheless, the mold assembly 100 may be used alone to form a component.

Figure 20:
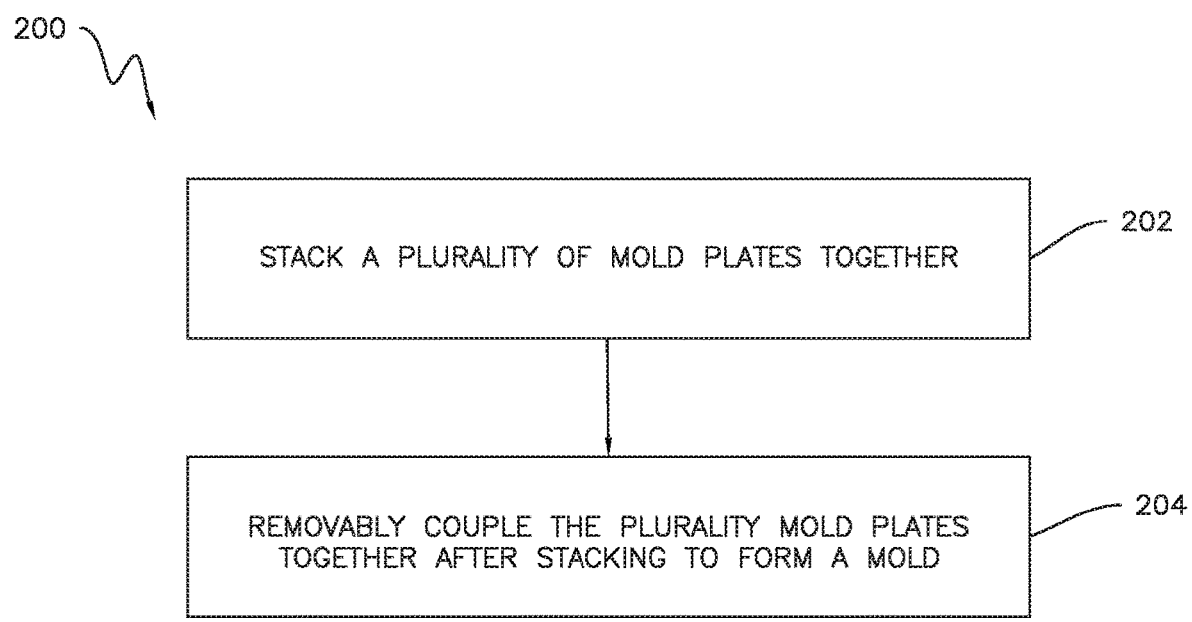
FIG. 20 is a flow chart illustrating one embodiment of a method for creating a vacuum forming assembly in accordance with aspects of the present disclosure.

FIG. 20 illustrates one embodiment of a method 200 for creating a vacuum forming mold assembly in accordance with aspects of the present subject matter. Although FIG. 20 depicts steps performed in a particular order for purposes of illustration and discussion, the methods discussed herein are not limited to any particular order or arrangement. As such, the various steps of the methods disclosed herein can be omitted, rearranged, combined, and/or adapted in various ways without deviating from the scope of the present disclosure.

As shown in FIG. 20, at (202), the method 200 includes stacking a plurality of mold plates together. For example, the plurality of mold plates 128 may be stacked together. In one embodiment, the mold plates 128 may be stacked together in the chord-wise direction 110. As described above, once stacked together, the first surfaces of the mold plates 128 define the mold cavity 134 of the mold 124. Furthermore, the grooves 148 defined by third surfaces 138 of the mold plates 128 provide clearance to form the associated vacuum passages 152 for use in vacuum forming operations.

At (204), the method may include removably coupling the plurality mold plates together after stacking to form a mold. For example, the mold plates 128 may be removably coupled together to form the mold 124, such as via suitable fasteners (e.g., T-bolts) or snap-fit features.

In several embodiments, the mold plates 128 may be stacked together one by one. More specifically, first and second mold plates 128 may be stacked together in (202) and then removably coupled in (204). A third mold plate 128 may then be stacked together with one of the first or second mold plates 128 in (202) and the coupled to one of the first or second mold plates 128 in (204). This process may be repeated until the mold 124 is formed. Alternatively, all of the mold plates 128 that form the mold 124 may be stacked together in (202) before being coupled in (204).

The mold assembly 100 and the associated method 200 for creating the mold assembly 100 provide advantages over conventional vacuum forming molds and methods of forming such molds. For example, as described above, certain mold plates 128 of the plurality of mold plates 128 may be removed from the mold 124 of the mold assembly 100. These removed mold plates 128 may then be modified and reinstalled in the mold 124 or replaced with the replacement mold plates 164 such that the mold assembly 100 is configured to form a new component. As such, a new mold is not required when design of the component initially formed by the mold assembly 100 changes. Furthermore, as mentioned above, the plurality of grooves 148 defined by the mold plates 128 form the vacuum passages 152 in the mold 124. These grooves 148 further permit modification of the mold plates 128. That is, when material is removed from the mold plates 128, the grooves 148 and the associated vacuum passages 152 shorten to compensate for the deeper mold cavity defined by the modified mold.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A mold assembly for vacuum forming a component, the mold assembly comprising:
   a plurality of support plates; and,
   a plurality of mold plates removably coupled to the plurality of support plates, the plurality of mold plates being stacked and removably coupled together to form a mold configured for forming the component, each mold plate including a first surface partially defining a top surface of the mold, a second surface spaced apart from the first surface, a third surface extending from the first surface to the second surface, and a fourth surface spaced apart from the third surface and extending from the first surface to the second surface,
   wherein one or more of the plurality of mold plates define at least one of:
      a plurality of grooves in the corresponding third surfaces extending from the corresponding first surfaces to the corresponding second surfaces, the third surfaces of one or more of the mold plates being in contact with the fourth surfaces of the adjacent mold plates such that each groove forms a vacuum passage within the mold;
      a plurality of grooves in the corresponding fourth surfaces extending from the corresponding first surfaces to the corresponding second surfaces, the fourth surfaces of one or more of the mold plates being in contact with the third surfaces of the adjacent mold plates such that each groove forms a vacuum passage within the mold; or
      one or more fluid passages and a plurality of vacuum channels fluidly coupling the mold cavity and one of the corresponding fluid passages.

2. The mold assembly of claim 1, wherein the one or more of the plurality of mold plates define the plurality of grooves in the corresponding third surfaces or the corresponding fourth surfaces, the plurality of support plates and the second surfaces of the plurality of mold plates partially define a vacuum chamber in fluid communication with the vacuum passages.

3. The mold assembly of claim 1, wherein one or more of the plurality of support plates are spaced apart from each other.

4. The mold assembly of claim 1, wherein one or more of the plurality of mold plates define the corresponding one or more fluid passages extending between a fifth surface of the corresponding plate and a sixth surface of the corresponding plate.

5. The mold assembly of claim 4, wherein the plurality of vacuum channels fluidly couple the mold cavity and the one of the one or more corresponding fluid passages.

6. The mold assembly of claim 1, further comprising:
   a sealant or an adhesive positioned between one or more pairs of adjacent mold plates, the sealant or the adhesive being positioned such that the vacuum passages are unobstructed by the sealant or the adhesive.

7. The mold assembly of claim 1, wherein one or more of the plurality of mold plates define at least one of a separation feature or a slot, the slot being configured to receive a sealant or an adhesive.

8. A method for creating a vacuum forming mold assembly, the method comprising:
   stacking a plurality of mold plates together, each mold plate including a first surface, a second surface spaced apart from the first surface, a third surface extending from the first surface to the second surface, and a fourth surface spaced apart from the third surface and extending from the first surface to the second surface, wherein one or more of the plurality of mold plates define at least one of:
- a plurality of grooves in the corresponding third surfaces extending from the corresponding first surfaces to the corresponding second surfaces;
- a plurality of grooves in the corresponding fourth surfaces extending from the corresponding first surfaces to the corresponding second surfaces; or
- one or more fluid passages and a plurality of vacuum channels fluidly coupled to one of the fluid passages; and, removably coupling the plurality mold plates together after stacking to form a mold, the first surface of one or more of the plurality of mold plates being configured to partially define a top surface of the mold, the mold cavity being configured to form a first component, wherein the third surfaces of one or more of the mold plates being in contact with the fourth surfaces of the adjacent mold plates after coupling such that each groove forms a vacuum passage within the mold when the one or more mold plates define the plurality of grooves in the corresponding third surfaces or the corresponding fourth surfaces.

9. The method of claim 8, further comprising:
machining a portion of one or more of the first surfaces of the plurality of mold plates to form the mold cavity of the mold such that the mold cavity is configured to form the first component.

10. The method of claim 8, further comprising:
when the plurality of mold plates are removably coupled together, machining a portion of one or more of the first surfaces of the plurality of mold plates to modify the mold cavity such that the mold cavity is configured to form a second component.

11. The method of claim 8, further comprising:
decoupling one or more of the plurality of mold plates; and,
removing one or more original mold plates of the plurality of mold plates from the mold.

12. The method of claim 11, further comprising:
positioning one or more replacement mold plates within the mold after removing the one or more original mold plates.

13. The method of claim 10, further comprising:
modifying the first surfaces of the one or more original mold plates such that the first surfaces of the one or more original mold plates partially define the mold cavity such that the mold cavity is configured to form a second component.

14. The method of claim 8, further comprising:
forming the plurality of grooves in the third surfaces or the fourth surfaces of one or more of the plurality of mold plates.

15. The method of claim 8, further comprising:
forming the one or more fluid passages in one or more of the plurality of mold plates, each fluid passage extending between a fifth surface of the corresponding mold plate and a sixth surface of the corresponding mold plate.

16. The method of claim 8, further comprising:
removably coupling the plurality of mold plates to a plurality of support plates.

17. A method for creating a vacuum forming mold assembly configured to form a rotor blade component of a wind turbine, the method comprising:
providing a plurality of mold plates, each mold plate including a first surface, a second surface spaced apart from the first surface, a third surface extending from the first surface to the second surface, and a fourth surface spaced apart from the third surface and extending from the first surface to the second surface;
forming at least one of:
- a plurality of grooves in the corresponding third surfaces extending from the corresponding first surfaces to the corresponding second surfaces;
- a plurality of grooves in the corresponding fourth surfaces extending from the corresponding first surfaces to the corresponding second surfaces; or
- one or more fluid passages and a plurality of vacuum channels fluidly coupled to one of the fluid passages;
stacking the plurality of mold plates together;
removably coupling the plurality mold plates together after stacking to create a mold configured to form a portion of the rotor blade, the third surfaces of one or more of the mold plates being in contact with the fourth surfaces of the adjacent mold plates such that each groove forms a vacuum passage within the mold when the one or more mold plates define the plurality of grooves in the corresponding third surfaces or the corresponding fourth surfaces; and,
machining a mold cavity into the first surfaces of one or more of the plurality of mold plates, the mold cavity having a shape associated with the portion of the rotor blade.

18. The method of claim 17, wherein stacking the plurality of mold plates together comprises stacking the plurality of mold plates together in a chord-wise direction of the rotor blade.

19. The method of claim 17, further comprising:
removably coupling the plurality of mold plates to a plurality of support plates, the plurality of support plates being spaced apart from each other in a span-wise direction of the rotor blade.

20. The method of claim 17, further comprising:
forming the one or more fluid passages in one or more of the plurality of mold plates, each fluid passage extending in a span-wise direction of the rotor blade between a fifth surface of the corresponding mold plate and a sixth surface of the corresponding mold plate.

* * * * *